(12) United States Patent
Hammond et al.

(10) Patent No.: US 11,740,626 B2
(45) Date of Patent: *Aug. 29, 2023

(54) REDUNDANT POSE GENERATION SYSTEM

(71) Applicant: Zoox, Inc., Foster City, CA (US)

(72) Inventors: Marcus Hammond, Mountain View, CA (US); Timothy David Kentley-Klay, Stanford, CA (US)

(73) Assignee: Zoox, Inc., Foster City, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 17/093,316

(22) Filed: Nov. 9, 2020

(65) Prior Publication Data

US 2021/0109521 A1    Apr. 15, 2021

Related U.S. Application Data

(63) Continuation of application No. 15/806,001, filed on Nov. 7, 2017, now Pat. No. 10,831,188.

(51) Int. Cl.
*G05D 1/00* (2006.01)
*G05D 1/02* (2020.01)
(Continued)

(52) U.S. Cl.
CPC ........... *G05D 1/0055* (2013.01); *B60W 30/00* (2013.01); *G05D 1/0077* (2013.01);
(Continued)

(58) Field of Classification Search
CPC ... B60W 30/00; G05D 1/0088; G05D 1/0212; G05D 1/0231; G05D 1/0268;
(Continued)

(56) References Cited

U.S. PATENT DOCUMENTS 8,060,254 B2    11/2011  Myeong et al.
8,259,994 B1     9/2012  Anguelov et al.
(Continued)

FOREIGN PATENT DOCUMENTS

EP    3109589 A1 * 12/2016    .......... G01C 21/165
GB    2545056 A       6/2017
(Continued)

OTHER PUBLICATIONS

Hiroto et al., "Estimating Camera Pose Using Trajectories Generated by Pan-Tilt Motion," 2014, vol. 1, Publisher: IEEE.*
(Continued)

*Primary Examiner* — Tuan C To
(74) *Attorney, Agent, or Firm* — Lee & Hayes, P.C.

(57) ABSTRACT

Techniques for performing multiple simultaneous pose generation for an autonomous vehicle. For instance, a system that navigates the autonomous vehicle can include at least a first component that determines first poses for the autonomous vehicle using at least a first portion of sensor data captured by one or more sensors and a second component that determines second poses for the autonomous vehicle using at least a second portion of the sensor data. The first component may have more computational resources than the second component and determine poses at a different frequency than the second component. The system may generate trajectories for the autonomous vehicle using the first poses when the first component is operating correctly. Additionally, the system may generate trajectories for the autonomous vehicle using the second poses when the first component is not operating correctly.

20 Claims, 10 Drawing Sheets

(51) Int. Cl.
*G01C 21/00* (2006.01)
*B60W 30/00* (2006.01)
(52) U.S. Cl.
CPC ......... *G05D 1/0088* (2013.01); *G05D 1/0212* (2013.01); *G05D 1/0231* (2013.01); *G05D 1/0268* (2013.01); *G05D 2201/0213* (2013.01)
(58) Field of Classification Search
CPC ............... G05D 1/0055; G05D 1/0077; G05D 2201/0213; G01C 21/00
USPC .......................................................... 701/25
See application file for complete search history.

(56) References Cited

U.S. PATENT DOCUMENTS

| | | | |
|---|---|---|---|
| 8,437,501 | B1 | 5/2013 | Anguelov et al. |
| 8,560,234 | B2* | 10/2013 | Kahn .................. G01S 19/49 701/470 |
| 9,701,239 | B2 | 7/2017 | Kentley et al. |
| 9,915,947 | B1* | 3/2018 | LaForge ............... G05D 1/0077 |
| 10,306,341 | B2* | 5/2019 | Reitsma ................ H04Q 9/00 |
| 10,429,847 | B2 | 10/2019 | Moore et al. |
| 10,831,188 | B2* | 11/2020 | Hammond ........... G05D 1/0077 |
| 11,004,234 | B2* | 5/2021 | Zhan ..................... G06V 20/70 |
| 2007/0280528 | A1* | 12/2007 | Wellington .......... G05D 1/0274 382/154 |
| 2009/0319170 | A1 | 12/2009 | Madsen et al. |
| 2013/0325334 | A1* | 12/2013 | Mian ................... G05D 1/0278 701/518 |
| 2014/0088855 | A1 | 3/2014 | Ferguson |
| 2016/0363454 | A1 | 12/2016 | Hatanaka et al. |
| 2017/0123429 | A1 | 5/2017 | Levinson et al. |
| 2017/0132334 | A1 | 5/2017 | Levinson et al. |
| 2017/0199040 | A1* | 7/2017 | Willis .................. G01C 21/26 |
| 2018/0143641 | A1 | 5/2018 | Rao |
| 2018/0231385 | A1* | 8/2018 | Fourie .................. G01C 22/00 |
| 2018/0307941 | A1 | 10/2018 | Holz et al. |
| 2018/0373254 | A1 | 12/2018 | Song et al. |
| 2019/0018412 | A1 | 1/2019 | Tschanz et al. |
| 2019/0026916 | A1 | 1/2019 | Liwicki et al. |
| 2019/0033867 | A1 | 1/2019 | Sharma |
| 2019/0064825 | A1 | 2/2019 | Tschanz et al. |
| 2019/0064839 | A1* | 2/2019 | Sakai .................. G05D 1/0289 |
| 2019/0101924 | A1 | 4/2019 | Styler et al. |
| 2019/0138000 | A1 | 5/2019 | Hammond et al. |

FOREIGN PATENT DOCUMENTS

| | | | | |
|---|---|---|---|---|
| WO | WO2009140184 | | 11/2009 | |
| WO | WO-2009140184 | A1 * | 11/2009 | ........... G01C 21/165 |
| WO | WO-2014042710 | A2 * | 3/2014 | ............. G01C 21/00 |

OTHER PUBLICATIONS

T. Harada et al., "Portable Orientation Estimation Device Based on Accelerometers, Magnetometers and Gyroscope Sensors for Sensor Network," 2003, Publisher: IEEE.*
Christian et al, "Road Geometry Estimation and Vehicle Tracking Using a Single Track Model", IEE Intelligent Vehicles Symposium, IEEE, 2008, 6 pages.
Office Action for U.S. Appl. No. 15/806,001, dated Nov. 1, 2019, Hammond, "Redundant Pose Generation System", 14 pages.
Final Office Action dated Apr. 20, 2020 for U.S. Appl. No. 15/806,001 "Redundant Pose Generation System" Hamond, 12 pages.
The PCT Search Report and Written Opinion dated Feb. 18, 2019, for PCT Application No. PCT/US2018/058387, 12 pages.

* cited by examiner

REDUNDANT POSE GENERATION SYSTEM

RELATED APPLICATIONS

This application is a continuation of and claims priority to U.S. patent application Ser. No. 15/806,001, filed on Nov. 7, 2017, tiled "REDUNDANT POSE GENERATION SYSTEM," the entirety of which is incorporated herein by reference.

BACKGROUND

Various systems are utilized by autonomous vehicles to guide such autonomous vehicles through environments that include both static and dynamic objects. For instance, autonomous vehicles utilize route planning systems to guide the autonomous vehicles along roads that include other moving vehicles (autonomous or otherwise), moving people, stationary buildings, etc. For a route planning system to operate correctly for an autonomous vehicle, the route planning system uses sensors and a control unit to determine both an orientation and/or position (together a pose) of the autonomous vehicle. The location and/or orientation is then used by the route planning system to guide the autonomous vehicle.

In some cases, the control unit within the autonomous vehicle may fail, causing the route planning system to no longer determine locations and orientations of the autonomous vehicle. This can cause problems for the autonomous vehicle, as the route planning system may no longer be capable of accurately guiding the autonomous vehicle. In such situations, it would be beneficial to continue receiving location and/or orientation information of the autonomous vehicle such that the route planning system can at least safely bring the autonomous vehicle to a stop.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
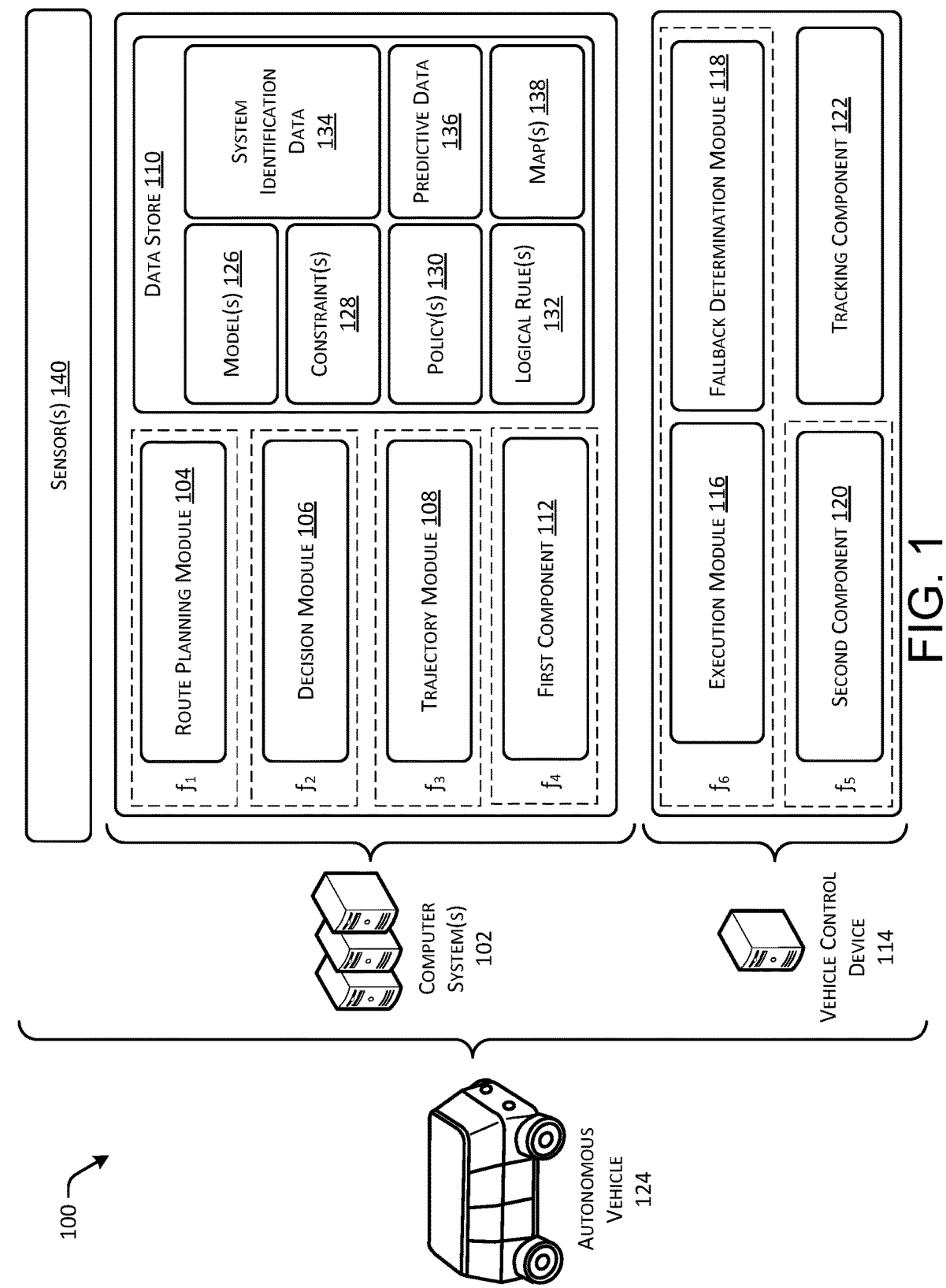
FIG. 1 illustrates an example architecture that utilizes dual pose estimation to generate and execute trajectories to control autonomous vehicles, as described herein.

As discussed above, a system may guide an autonomous vehicle along a route by generating trajectories for the autonomous vehicle. For instance, the system may include a control unit that determines a location and/or orientation (together a pose) of the autonomous vehicle as it traverses a trajectory along a path. The system can then use the locations and/or orientations to generate the trajectories, as well as to ensure that the vehicle is following a planned trajectory. However, if the control unit fails, thus causing the system to no longer have the capability of determining the locations and/or orientations of the autonomous vehicle, the system may be unable to accurately generate the trajectories for guiding the autonomous vehicle, or to determine if the vehicle is following the previously calculated trajectory accurately.

This disclosure is generally directed to methods, apparatuses, and systems for performing redundant pose generation for an autonomous vehicle. In some examples where two different systems are used to generate pose, the system may be referred to as a dual pose generation. However, any level of redundancy is contemplated (e.g. some examples may have triply redundant systems). The pose associated with the autonomous vehicle can indicate a location (e.g., position) and/or orientation of the autonomous vehicle in a coordinate system (e.g., inertial coordinate system, track based coordinate system, map based coordinate system, etc.). For instance, in some examples, the pose of the autonomous vehicle can be described in a two-dimensional inertial coordinate system using a coordinate (x, y) and angular offset (yaw). Similarly, the pose of the autonomous vehicle in a three-dimensional coordinate system can be described by a coordinate (x, y, z), as well as an orientation (roll, pitch, yaw). Additionally, in some examples, the pose of the autonomous vehicle can be described in a track based coordinate system with the coordinates (s, t, [yaw_offset]), where 's' is an offset along a trajectory of a track, 't' is the offset perpendicular to the trajectory of the track, and yaw_offset is relative to a direction of travel along the track. Of course, any other representation of a location and/or orientation is contemplated (Euler angles, quaternions, etc.).

To perform redundant pose generation, the methods, apparatuses, and systems may include two or more components that each determine a respective pose of the autonomous vehicle. For instance, the first component can include a first computing system and the second component can include a second, separate, computing system. For instance, in some examples, a first component may include an executive motion unit (EMU) that determines first poses of the autonomous vehicle and a second component may include an electronic control unit (ECU) that determines second poses of the autonomous vehicle. In other examples, a first component may include a primary EMU or primary ECU that determines the first poses of the autonomous vehicle and a second component may include a secondary EMU or secondary ECU that determines the second poses of the autonomous vehicle. Still, in some examples, the first and second components can each include any type of control unit that includes the capability to determine poses for an autonomous vehicle.

To determine the poses, the methods, apparatuses, and systems include one or more sensors that generate (e.g., capture) sensor data associated with the autonomous vehicle (and/or the environment through which the vehicle is traversing), which is then used by components to determine the poses. The one or more sensors can include light detection and ranging (LIDAR) sensors for capturing LIDAR data, camera sensors for capturing vision data, radio detection and ranging (RADAR) sensors for capturing range, angle, and/or velocity of objects in an environment, sound navigation and ranging (SONAR) sensors for capturing acoustic information, ultrasonic transducers, wheel encoders, microphones, inertial measurement unit(s) (IMU), accelerometers, gyroscopes, magnetometers, temperature sensors, humidity sensors, light sensors, global positioning system (GPS) sensors, etc.

In some instances, the first component may use a first portion of the sensor data to determine the first poses of the autonomous vehicle and the second component may use a second portion of the sensor data to determine the second poses of the autonomous vehicle. For example, the first component may utilize one or more first algorithms to analyze the first portion of the sensor data in order to determine the first poses. The one or more algorithms may be computationally-intensive, and the first portion of the sensor data may include LIDAR data captured by one or more LIDAR sensors and/or vision data captured by one or more camera sensors. Additionally, the second component may utilize one or more second algorithms to analyze the second portion of the sensor data in order to determine the second poses. The one or more second algorithms may be less computationally-intensive as the one or more first algorithms. For instance, the second portion of the sensor data may include geolocation data captured by one or more GPS sensors and/or acceleration and direction data captured by one or more IMU sensors.

The methods, apparatuses, and systems may use the first poses from the first component to determine the routes and/or the trajectories of the autonomous vehicle when the first component is operating correctly. For instance, one or more modules, such as a route planning module, a decision module, and/or a trajectory module, may utilize the first poses to generate the routes and/or trajectories for the autonomous vehicle while the first component is operating correctly. In some instances, the first component is deemed to be operating correctly when (1) the first component continuously determines the first poses of the autonomous vehicle and (2) the first poses are accurate (e.g., within one or more thresholds).

For instance, to determine if the first component is operating correctly, the second component may receive the first poses from the first component and perform an analysis on the first poses. For example, the second component may compare a first pose received from the first component to a second pose determined by the second component. In some instances, to compare the first pose to the second pose, the second component determines at least one difference between the first pose and the second pose. The second component can then compare the at least one difference to at least one threshold to determine if the first component is operating correctly. For instance, the second component can determine that the first component is operating correctly when the at least one difference is within at least one threshold, and the second component can determine that the first component is not operating correctly when the at least one difference exceeds the at least one threshold.

In some instances, the at least one difference can include a Euclidian difference between any one or more coordinates, an angular difference in any Euler angle, a difference in quaternions, and/or the like. For example, the second component can determine the Euclidian difference between the first pose and the second pose. The second component can then determine if the Euclidian difference exceeds a threshold. In some instances, the at least one difference can include a weighted Euclidian difference (e.g., a Mahalanobis distance). For example, the second component can determine the Mahalanobis difference between the first pose and the second pose. The second component can then determine if the Mahalanobis difference exceeds a threshold.

Additionally, or alternatively, in some instances, the at least one difference can include one or more location differences. For instance, the second component can determine a first difference between the x-coordinate from the first pose and the x-coordinate from the second pose, a second difference between the y-coordinate from the first pose and the y-coordinate from the second pose, and/or a third difference between the z-coordinate from the first pose and the z-coordinate from the second pose. The second component can then determine if at least one of the distance differences exceeds a respective threshold distance. For instance, the second component can determine if the first difference in the x-coordinates exceeds a first threshold distance, if the second difference in the y-coordinates exceeds a second threshold distance, and/or if the third difference in the z-coordinates exceeds a third threshold distance. In some instances, each of the first threshold distance, the second threshold distance, and the third threshold distance may include a similar distance. In some instances, one or more of the first threshold distance, the second threshold distance, and the third threshold distance may include a unique distance.

Additionally, or alternatively, in some instances, the at least one difference can include one or more orientation differences. For instance, the second component can determine a first difference between the first roll from the first pose and the second roll from the second pose, a second difference between the first pitch from the first pose and the second pitch from the second pose, and/or a third difference between the first yaw from the first pose and the second yaw from the second pose. The second component can then determine if at least one of the orientation differences exceeds a respective orientation threshold. For instance, the second component can determine if the first difference between the first roll and the second roll exceeds a roll threshold, if the second difference between the first pitch and the second pitch exceeds a pitch threshold, and/or if the third difference between the first yaw and the second yaw exceeds a yaw threshold.

In some instances, the second component can determine that the first component is not operating correctly when at least one of the differences described above exceeds a respective threshold. For instance, the second component can determine that the first component is not operating correctly when the first difference between the x-coordinates from the first pose and the second pose exceeds the first threshold distance. For instance, the second component can determine that the first component is not operating correctly when the Euclidian distance between the first pose and the second pose exceeds a threshold. Additionally, or alternatively, in some instances, the second component can determine that the first component is not operating correctly when two or more of the differences described above exceed a respective threshold. For instance, the second component can determine that the first component is not operating correctly when the first difference between the x-coordinates exceeds the first threshold distance and the second difference between the y-coordinates exceeds the second threshold distance.

In some instances, in addition to comparing the first pose and the second pose, the second component can determine that the first component is not operating correctly based on the first component ceasing from determining the first poses. For instance, the first component may be configured to send the second component a respective first pose at given time intervals, such as every millisecond, second, or the like. If the first component fails to operate correctly, the first component may cease from sending the second component the first poses. The second component can thus determine that the first component is not operating correctly based on not receiving a first pose from the first component for a given period of time. In some instances, the given period of time can include the given time interval. Additionally, or alternatively, in some instances, the given time period can include a different time period (e.g., twice the given time interval).

In some instances, based on the second component determining that the first component is not operating correctly, the second component can send data to the one or more modules that indicates that the first component is not operating correctly. Additionally, the second component can send the second poses to the one or more modules so that the one or more modules can continue to generate the routes and/or trajectories for the autonomous vehicle. The one or more modules can receive the data and/or the second poses from the second component and, in response, cause the autonomous vehicle to perform a given action. In some instances, the given action can include causing the autonomous vehicle to safely stop, and the one or more modules can use at least one of second poses to generate a trajectory for the autonomous vehicle that causes the autonomous vehicle to safely stop. In some instances, the given action can include causing the autonomous vehicle to continue to travel along a route, and the one or more modules can use at least one of the second poses to continue to determine trajectories for the autonomous vehicle that cause the autonomous vehicle to travel along the route.

Additionally, or alternatively, in some instances, based on the second component determining that the first component is not operating correctly, the second component can send data to the one or more modules that indicates that the first component is not operating correctly. Additionally, the second component can include one or more modules that generate the routes and/or trajectories for the autonomous vehicle using the second poses. For instance, the one or more modules of the second component can use the second poses to cause the autonomous vehicle to perform a given action. In some instances, the given action can include causing the autonomous vehicle to safely stop, and the one or more modules can use at least one of second poses to generate a trajectory for the autonomous vehicle that causes the autonomous vehicle to safely stop. In some instances, the given action can include causing the autonomous vehicle to continue to travel along a route, and the one or more modules can use at least one of the second poses to continue to determine trajectories for the autonomous vehicle that cause the autonomous vehicle to travel along the route.

It should be noted that, in some instances, the second component may utilize the first poses received from the first component to determine the second poses. For instance, since the second component may be less computationally-intensive than the first component, the second component may utilize senor data captured by one or more IMUs to determine the second poses for the autonomous vehicle. When using sensor data captured by one or more IMUs, the second component may require an initial pose of the autonomous vehicle to begin determining the second poses. As such, the first component may determine the initial component of the autonomous vehicle and send the initial pose to the second component. The second component can then use the initial pose and the sensor data captured by the one or more IMUs to determine the second poses of the autonomous vehicle. As a non-limiting example, the first system may provide highly accurate localization information of the vehicle. In such an example, the second system may initialize with a first pose of the first system, and subsequently generate second poses based on, for example, a dead reckoning system.

Additionally, in some instances, in order to determine more accurate second poses, the second component may utilize received first poses from the first component to continue to determine the second poses. For instance, the second component may analyze a first pose with respect to a second pose and, based on the analysis, determine that the first component is operating correctly. Based on the determination, the second component may utilize the first pose to determine the next second pose of the autonomous vehicle. For instance, the second component may determine the next second pose of the autonomous vehicle using the first pose and the sensor data captured by the one or more IMUs. In such instances, by intermittently using a pose of the first system as the last known pose of the second system, various drifts and biases may be minimized or eliminated.

It should further be noted that, in some instances, the first component and the second component may be similar to one another. For instance, the first component and the second component may each include an EMU or an ECU, and the first component and the second component may use similar sensor data to determine poses. Additionally, in some instances, the methods, apparatuses, and methods may include more than two components to determine poses for the autonomous vehicle. In such instances, one or more of the components may perform the analysis above to determine whether one or more of the other components is operating correctly.

FIG. 1 illustrates an example architecture 100 that utilizes dual pose estimation to generate and execute trajectories to control autonomous vehicles, as described herein. For example, the architecture 100 can include computer system(s) 102 including various hardware and/or software to implement aspects of the systems, methods, and apparatuses described herein. For example, the computer system(s) 102 can include a route planning module 104, a decision module 106, a trajectory module 108, a data store 110, and a first component 112. Additionally, the architecture 100 can include a vehicle control device 114 including various hardware and/or software to implement aspects of the systems, methods, and apparatuses described herein. In some examples, the vehicle control device 114 can be a separate and distinct computer system, which can include an execution module 116, a fallback determination module 118, a second component 120, and a tracking component 122. In some examples, the computer system 102 may comprise the vehicle control device 114.

In some instances, the computer system(s) 102 and vehicle control device 114 can be embodied in an autonomous vehicle 124, or any other type of transportable computer system. In other instances, the computer system(s) 102 can be remotely located from the autonomous vehicle 124 and the vehicle control device 114 can be embodied in the autonomous vehicle 124. Still, in some instances, on or more modules and/or components of the computer system(s) 102 can be remotely located from the autonomous vehicle 124. In some instances, the computer system(s) 102 can provide planning functionality for the autonomous vehicle 124 and the vehicle control device 114 can provide execution functionality for the autonomous vehicle 124, as described herein.

As described above, the computer system(s) 102 can include a route planning module 104, a decision module

106, a trajectory module 108, a data store 110, a first component 112, and a second component 120. In at least one example, individual modules of the modules (e.g., the route planning module 104, the decision module 106, and the trajectory module 108) can have different frequencies of operation. As illustrated in FIG. 1, the route planning module 104 can have a first frequency of operation (e.g., $f_1$), the decision module 106 can have a second frequency of operation (e.g., $f_2$), and the trajectory module 108 can have a third frequency of operation (e.g., $f_3$). In at least one example, the first frequency can be the lowest frequency (e.g., 10 Hertz) and the third frequency can be the highest frequency (e.g., 100 Hertz). That is, in at least one example, the route planning module 104 can process data at a lower speed than the decision module 106, which can process data at a lower speed than the trajectory module 108. The different frequencies can enable the architecture 100 to distribute computational resources to modules based on a frequency in which individual modules receive updated data and/or a time period in which individual modules need to process and output data.

The route planning module 104 can be configured to determine a most efficient route to travel from a first location (e.g., a current location) to a second location (e.g., a target location). For the purpose of this discussion, a route can be a sequence of waypoints and/or road segments for travelling between two locations. As non-limiting examples, waypoints include streets, intersections, global positioning system (GPS) coordinates, etc. In at least one example, the route planning module 104 can perform a search, such as a graph search, on top of a map to identify a route to guide the autonomous vehicle 124 from a first location to a second location. For the purpose of this discussion, a map can be any number of data structures modeled in two dimensions or three dimensions that are capable of providing information about an environment, such as, but not limited to, topologies (such as intersections), streets, mountain ranges, roads, terrain, and the environment in general. In at least one example, the route planning module 104 can utilize a graph traversal algorithm to identify a route to guide an autonomous vehicle from a first location to a second location. Graph traversal algorithms can include algorithms for unweighted graphs (e.g., breadth first search, depth first search, greedy best first, A* search, etc.) and/or weighted graphs (e.g., Dijkstra's algorithm, weighted A* search, etc.).

In at least one example, the decision module 106 can receive the route (e.g., a sequence of waypoints) and can generate an instruction for guiding the autonomous vehicle 124 along at least a portion of the route from the first location to the second location. In at least one example, the decision module 106 can determine how to guide the autonomous vehicle 124 along a segment of the route. In some examples, the instruction can define a trajectory, or a portion of a trajectory. In such examples, the decision module 106 can generate a sequence of actions (e.g., drive down the road, accelerate, change lanes, turn left, etc.) to guide the autonomous vehicle 124 along the route. A non-limiting example of a trajectory can be "drive the autonomous vehicle at 10 meters/second." In other examples, the instruction can be a policy. A policy can be used to determine a trajectory of the autonomous vehicle 124 based on real-time processed sensor data received from sensor(s) on the autonomous vehicle 124. A non-limiting example of a policy can be "follow the car in front by 5 meters."

In at least one example, the decision module 106 can utilize one or more models and/or algorithms to determine an instruction for guiding the autonomous vehicle 124 from the first location to the second location in view of constraint(s). For instance, in at least one example, the decision module 106 can utilize a combination of temporal logic (e.g., linear temporal logic (LTL), signal temporal logic (STL), interval temporal logic (ITL), computational tree logic (CTL) property specification language (PSL), Hennessy-Milner logic (HML), etc.) and a search algorithm (e.g., policy tree search, Monte Carlo Tree Search (MCTS), exhaustive search, etc.) to determine one or more candidate instructions and evaluate a performance of each of the potential instructions prior to determining which instruction to select. Additional details associated with the decision module 106 are described in related application Ser. No. 15/632,147 entitled "Trajectory Generation Using Temporal Logic and Tree Search", which is incorporated by reference herein, in its entirety. The decision module 106 can output the instruction to the trajectory module 108.

In at least one example, the decision module 106 can determine a fallback instruction. The fallback instruction can be an instruction that the autonomous vehicle 124 is to follow when an event warranting a fallback action, described below, occurs. In such an example, the decision module 106 can provide the fallback instruction to the trajectory module 108 and/or the fallback determination module 118. In some instances, the decision module 106 can provide a fallback instruction to the trajectory module 108 and/or the fallback determination module 118 at the same time that the decision module 106 provides an instruction to the trajectory module 108 (i.e., the decision module 106 can provide two instructions to the trajectory module 108). In other instances, the decision module 106 can provide a fallback instruction to the trajectory module 108 and/or the fallback determination module 118 at different times than when the decision module 106 provides an instruction to the trajectory module 108.

The trajectory module 108 can receive the instruction and can optimize the instruction based on objects identified in the environment. In at least one example, the trajectory module 108 can access, receive, and/or determine real-time processed sensor data to determine object(s) in the environment which the autonomous vehicle 124 is travelling. In the at least one example, the trajectory module 108 can process the instruction in view of the real-time processed sensor data.

In an example where the instruction is a trajectory, the trajectory module 108 can leverage model(s) and/or algorithm(s), constraint(s), and/or cost(s) to optimize the trajectory. For instance, the trajectory module 108 can utilize model(s) and/or algorithm(s) including, but not limited to, differential dynamic programming, interior point optimization, sequential quadratic programming, etc. to refine the trajectory. In at least one example, the constraint(s) can include, but are not limited to, cost(s), comfort, safety, rules of the road, etc. In at least one example, the cost(s) can include, but are not limited to, performance (e.g., speed), minimizing lateral acceleration, positioning in a lane, etc. In at least one example, the model(s) and/or algorithm(s) can include bi-directionality. In such an example, a velocity of the autonomous vehicle 124 can be optimized to include a positive, a negative, or a zero value. In at least one example, a rotation of the autonomous vehicle 124 can be described using Euclidian matrices. As a result, a same model and/or algorithm can be used for optimizing a trajectory having different types of waypoints (e.g., road, intersection, roundabout, etc.). Based at least in part on processing the trajectory, in view of the real-time processed sensor data, the trajectory module 108 can generate an output trajectory.

In an example where the instruction is a policy, the trajectory module 108 can leverage model(s) and/or algorithm(s), constraint(s), and/or cost(s) to generate a trajectory based on the policy and real-time processed sensor data. For instance, the trajectory module 108 can utilize model(s) and/or algorithm(s) including, but not limited to, differential dynamic programming, interior point optimization, sequential quadratic programming, etc. to generate a trajectory based on the policy. For the purpose of this discussion, the trajectory can be called an output trajectory.

The trajectory module 108 can access, receive, and/or determine real-time processed sensor data and poses of the autonomous vehicle 124 to determine the trajectories. For instance, the trajectory module 108 can leverage the real-time processed sensor data to generate an output trajectory. The trajectory module 108 can utilize a more detailed model of the autonomous vehicle 124 than the decision module 106. Processing that utilizes such a detailed model can be computationally expensive. Additionally, the trajectory module 108 can output an output trajectory within a predetermined amount of time after receiving the real-time processed sensor data and poses.

In at least one example, the trajectory module 108 can receive a fallback instruction from the decision module 106. In such examples, the trajectory module 108 can generate an output fallback trajectory based on processing the fallback instruction in a substantially similar manner as described above. In some examples, as described above, the trajectory module 108 can output the output trajectory and the output fallback instruction at the same time.

The first component 112 can receive input from one or more of the sensor(s) 140 on the autonomous vehicle 124. In at least one example, the autonomous vehicle 124 can have sensor(s) 140 which can include light detection and ranging (LIDAR) sensors for capturing LIDAR data, camera sensors for capturing vision data, radio detection and ranging (RADAR) sensors for capturing range, angle, and/or velocity of objects in an environment, sound navigation and ranging (SONAR) sensors for capturing acoustic information, etc. Additionally, in some examples, the sensor(s) 140 can include ultrasonic transducers, wheel encoders, microphones, inertial measurement unit(s) (IMU), accelerometers, gyroscopes, magnetometers, temperature sensors, humidity sensors, light sensors, global positioning system (GPS) sensors, etc.

The first component 112 can process data received from the one or more sensor(s) 140 to determine a state of the autonomous vehicle 124 at a particular time. That is, the first component 112 can process data received from the one or more sensor(s) 140 to determine at least a first pose (e.g., location and orientation) of the autonomous vehicle 124 at a particular time. In at least one example, the one or more sensor(s) 140 and the first component 112 can be associated with a perception system for performing data analysis such as segmentation and classification. As described below, such data (e.g., real-time processed sensor data) and first poses can be used by the trajectory module 108 for generating output trajectories. Additionally, such data (e.g., real-time processed sensor data) and first poses can be used by the route planning module 104 for planning routes and/or the decision module 106 for generating instructions.

The second component 120 can also process data received from one or more of the sensor(s) 140 to determine a state of autonomous vehicle 124 at a particular time. That is, the second component 120 can process data received from one or more sensor(s) 140 to determine at least a second pose (e.g., location and orientation) of the autonomous vehicle 124 at a second particular time. As shown in the example of FIG. 1, the first component 112 may determine the state (e.g., first poses) of the autonomous vehicle 124 using a fourth frequency of operation (e.g., $f_4$) and the second component 120 may determine the state (e.g., second poses) of the autonomous vehicle 124 using a fifth frequency of operation (e.g., $f_5$). In some instances, the fourth frequency can include a higher frequency than the fifth frequency. For instance, the first component 112 may determine the state of the autonomous vehicle 124 using a frequency of 100 Hertz and the second component 120 can determine the state of the autonomous vehicle 124 using a frequency of 50 Hertz. In some instances, the fourth frequency can include a similar frequency as the fifth frequency. For instance, both the first component 112 and the second component 120 may determine a state of the autonomous vehicle 124 using a frequency of 100 Hertz. In some instances, the fourth frequency can include a lower frequency than the fifth frequency.

In some instances, the first component 112 can include first computing system and the second component 120 can include a second computing system. In some instances, and as shown in FIG. 1, the first component 112 is included in the computer system(s) 102 and the second component 120 is included in the vehicle control device 114. In some instances, the first component 112 can determine the first poses using one or more first algorithms (e.g., simultaneous localization and mapping (SLAM system) with non-linear leas squares optimization, point set registration algorithms, genetic algorithms, Kalman filters, Bayesian filters, bundle adjustments, bag-of-words, ICP, etc.) that are more computationally-intensive than the one or more second algorithms used by the second component 120 to determine the second poses. For instance, the one or more first algorithms utilized by the first component 112 may analyze a first portion of the sensor data to determine the first poses, such as LIDAR data captured by one or more LIDAR sensors and/or vision data captured by one or more cameras. Additionally, the one or more second algorithms (e.g., simultaneous localization and mapping (SLAM system) with non-linear leas squares optimization, point set registration algorithms, genetic algorithms, Kalman filters, Bayesian filters, bundle adjustments, bag-of-words, ICP, etc.) utilized by the second component 120 may analyze a second portion of the sensor data to determine the second poses, such as data captured by one or more IMUS and/or GPS data. As such, in some instances, the first component 112 may be configured to determine more accurate poses for the autonomous vehicle 124 than the second component 120.

The first component 112 can send the first poses to the second component 120 for analysis. In some instances, the first component 112 can send the second component 120 a respective first pose each time the first component 112 determines a pose for the autonomous vehicle 124. In some instances, the first component 112 can send the second component 120 respective first poses at given time intervals. A given time interval may be based on the fifth frequency of the second component 120, though any other time interval is contemplated. For instance, the first component 112 may send the second component 120 a respective first pose each time the second component 120 determines a respective second pose that corresponds to the respective first pose.

In some instances, the second component 120 analyzes the first poses received from the first component 112 to determine if the first component 112 is operating correctly (e.g., correctly determining poses of the autonomous vehicle 124). For instance, the second component 120 may compare a first pose received from the first component 112 to a second pose determined by the second component 120. In some instances, to compare the first pose to the second pose, the second component 120 determines at least one difference between the first pose and the second pose. The second component 120 can then compare the at least one difference to at least one threshold to determine if the first component 112 is operating correctly. For instance, the second component 120 can determine that the first component 112 is operating correctly when the at least one difference is within at least one threshold, and determine that the first component 112 is not operating correctly when the at least one difference exceeds the at least one threshold.

In some instances, the at least one difference can include a Euclidian difference between any one or more coordinates, an angular difference in any Euler angle, a difference in quaternions, and/or the like. For example, the second component can determine the Euclidian difference between the first pose and the second pose. The second component can then determine if the Euclidian difference exceeds a threshold. In some instances, the at least one difference can include a weighted Euclidian difference (e.g., a Mahalanobis distance). For example, the second component can determine the Mahalanobis difference between the first pose and the second pose. The second component can then determine if the Mahalanobis difference exceeds a threshold.

Additionally, or alternatively, in some instances, the at least one difference can include one of more location differences. For instance, the second component 120 can determine a first difference between the x-coordinate from the first pose and the x-coordinate from the second pose, a second difference between the y-coordinate from the first pose and the y-coordinate from the second pose, and/or a third difference between the z-coordinate from the first pose and the z-coordinate from the second pose. The second component 120 can then determine if at least one of the distance differences exceeds a respective threshold distance. For instance, the second component 120 can determine if the first difference in the x-coordinates exceeds a first threshold distance, if the second difference in the y-coordinates exceeds a second threshold distance, and/or if the third difference in the z-coordinates exceeds a third threshold distance.

In some instances, each of the first threshold distance, the second threshold distance, and the third threshold distance can include a similar distance. For instance, each of the first threshold distance, the second threshold distance, and the third threshold distance can include one millimeter, one inch, or the like. In some instances, one or more of the first threshold distance, the second threshold distance, and the third threshold distance can be different from one another. For instance, the first threshold distance may include a greater distance than the second threshold distance and/or the third threshold distance.

Additionally, or alternatively, in some instances, the at least one difference can include one or more orientation differences. For instance, the second component 120 can determine a first difference between the first roll from the first pose and the second roll from the second pose, a second difference between the first pitch from the first pose and the second pitch from the second pose, and/or a third difference between the third yaw from the first pose and the second yaw from the second pose. The second component 120 can then determine if at least one of the orientation differences exceeds a respective orientation threshold. For instance, the second component 120 can determine if the first difference between the first roll and the second roll exceeds a roll threshold, if the second difference between the first pitch and the second pitch exceeds a pitch threshold, and/or if the third difference between the first yaw and the second yaw exceeds a yaw threshold.

In either of the examples above, the respective thresholds can take into consideration tolerances of the sensors 140 and/or the algorithms for which the first component 112 and the second component 120 are using to determine the respective poses. For instance, the respective thresholds may be set such that the second component 120 will not determine that the first component 112 is operating incorrectly when there is a slight difference between the first poses and the second poses. Additionally, the respective thresholds may update based on confidences associated with the first pose and the second pose. For instance, the second component 120 can use a respective lower threshold when there are low confidences for the first pose and the second pose, and use a respective greater threshold when there are high confidences for the first pose and the second pose.

In some instances, the second component 120 can determine that the first component 112 is not operating correctly when at least one of the differences described above exceeds a respective threshold. For instance, the second component 120 can determine that the first component 112 is not operating correctly when the Euclidean difference between the first pose and the second pose exceeds the threshold distance. Additionally, or alternatively, in some instances, the second component 120 can determine that the first component 112 is not operating correctly when two or more of the differences described above exceed a respective threshold. For instance, the second component 120 can determine that the first component 112 is not operating correctly when the first difference between the x-coordinates exceeds the first threshold distance and the second difference between the y-coordinates exceeds the second threshold distance.

In some instances, in addition to analyzing the poses with respect to the second poses, the second component 120 can determine that the first component 112 is not operating correctly based on the second component 120 not receiving data from the first component 112. For instance, as discussed above, the first component 112 may be configured to send the second component 120 a respective first pose at given time intervals (e.g., the fourth frequency, the fifth frequency, etc.), such as every millisecond. If the first component 112 fails to operate correctly, the first component 112 may cease sending the second component 120 a respective first pose. The second component 120 can determine that the first component 112 is not operating correctly based on the second component 120 not receiving a respective first pose for a given period of time. In some instances, the given period of time can include the given time interval in which the first component 112 is configured to send data to the second component 120. In some instances, the given time period may include a different time period, such as twice as long as the given time interval.

In some instances, based on determining that the first component 112 is no longer operating correctly, the second component 120 can send data to the route planning module 104, the decision module 106, and/or the trajectory module 108 that indicates that the first component 112 is not operating correctly. Additionally, the second component 120 can send the second poses determined by the second component 120 to the route planning module 104, the decision module 106, and/or the trajectory module 108. The route planning module 104, the decision module 106, and/or the trajectory module 108 can then use the second poses to respectively generate routes, instructions, and trajectories for the autonomous vehicle 124.

For instance, the route planning module 104 can use the real-time processed sensor data and the second poses for planning routes for the autonomous vehicle 124. Additionally, the decision module 106 can use the real-time processed sensor data and the second poses for generating instructions for the autonomous vehicle 124. Furthermore, the trajectory module 108 can use the real-time processed sensor data and the second poses to generate output trajectories for the autonomous vehicle 124. In some instances, the trajectory module 108 uses the real-time processed sensor data and the second poses to generate a fallback trajectory that is associated with to a fallback action. The fallback action can correspond a safety maneuver, such as aggressively stopping the autonomous vehicle 124, driving to the shoulder of the road and stopping, or the like.

It should be noted that, in some instances, the second component 120 may utilize the first poses from the first component 112 to determine the second poses. For instance, since the second component 120 may use less computationally-intensive algorithm(s) to determine the second poses, which may determine the second poses using sensor data captured from one or more IMUS, GPS, wheel encoder data, and/or the like, the second component 120 may require an initial pose of the autonomous vehicle 124 to begin determining the second poses. As such, the first component 112 may send the second component 120 an initial pose, such as when the autonomous vehicle 124 begins to travel a given route, and the second component 120 may utilize the initial pose to determine one or more of the second poses for the autonomous vehicle 124.

Additionally, in some instances, the second component 120 may continue to utilize first poses that are received from the first component 112 to determine the second poses. For instance, each time the second component 120 analyzes a first pose from the first component 112 and determines, based on the analysis, that the first component 112 is operating correctly, the second component 120 may use the first pose as the current pose of the autonomous vehicle 124. The second component 120 can then determine a second pose using the current pose and the sensor data captured by the one or more IMUs and/or additional sensor data (e.g. GPS data, wheel encoder data, etc.).

The data store 110 can store data so that it can be organized, updated, and accessed. In at least one example, the data store 110 can include model(s) 126, constraint(s) 128, policy(s) 130, logical rule(s) 132, system identification data 134, predictive data 136, map(s) 138, etc. The model(s) 126 can include model(s) of the autonomous vehicle 124, model(s) of other objects in the environment, decision model(s), etc.

Any number of vehicle models can be used with the systems and methods discussed herein. In some examples, a vehicle model having coarse discretizations of possible actions and/or predicted steering angle can be used. The choice of a particular vehicle model can be made to generate feasible trajectories that could be executed by an autonomous vehicle.

As described above, the vehicle control device 114 can be a separate and distinct computer system, which can include an execution module 116 and a fallback determination module 118. In some examples, the vehicle control device 114 can access the data store 110, the first component 112, and/or the second component 120 associated with the computer system(s) 102.

The execution module 116 can receive the output trajectory from the trajectory module 108 and can compute commands for actuating steering and acceleration of the autonomous vehicle 124 to enable the autonomous vehicle 124 to follow the output trajectory. In at least one example, the execution module 116 can receive the output trajectory and can compute a steering angle and velocity to enable the autonomous vehicle 124 to follow the output trajectory. A non-limiting example of an algorithm that the execution module 116 can use is provided below.

$$\delta = -P * ela \quad (1)$$

$$ela = e + xla * \sin(\Delta \Psi) \quad (2)$$

In equations (6) and (7) above, a gain (e.g., a predetermined constant value) is represented by P, lateral error is represented by e, lookahead error is represented by ela, heading error is represented by $\Delta\Psi$, lookahead distance (parameter) is represented by xla, and steering angle is represented by $\delta$.

The fallback determination module 118 can access, receive, and/or generate fallback trajectory(s). As described above, a fallback trajectory can be a trajectory that the autonomous vehicle 124 is to follow responsive to determining an occurrence of an event warranting a fallback action. In at least one example, an event can be a problem with the computer system(s) 102. For instance, a sensor associated with the computer system(s) 102 can fail of the autonomous vehicle 124 can malfunction. Or, an event can be associated with a lack of communication from the computer system(s) 102 and/or responsiveness of the computer system(s) 102. For instance, the event may include a lack of communication with the first component 112. In at least one example, an event can include one of the components (e.g., the first component 112) malfunctioning. For instance, the event can occur when the first component 112 fails to determine poses of the autonomous vehicle 124 and/or the second component 120 determines that the first component 112 is no longer determining correct poses (using the techniques described herein).

In at least one example, a fallback trajectory can correspond to a fallback action, which may correspond to a safety maneuver, such as aggressively stopping the autonomous vehicle 124, driving to the shoulder of the road and stopping, etc. In some examples, the fallback action may not be "smooth" to a passenger, but may safely navigate a situation responsive to an occurrence of an event In some examples, the fallback determination module 118 can receive an output fallback trajectory from the decision module 106 and/or the trajectory module 108. In such examples, the fallback determination module 118 can store the output fallback trajectory for a predetermined period of time, until a new output fallback trajectory is received, etc. In other examples, the fallback determination module 118 can generate a fallback trajectory based at least in part on real-time processed sensor data, hard-coded rule(s), and the second poses determined by the second component 120. In some examples, because the second component 120 continually provides a second pose estimate to any module or submodule of system 102 or vehicle control device 114, such trajectories may include complex maneuvers, including turning, changing lanes, moving to the side of a road, and bringing the autonomous vehicle 124 to a safe location.

In at least one example, the fallback determination module 118 can provide a fallback trajectory to the execution module 116 and the execution module 116 can compute commands for actuating steering and acceleration of the autonomous vehicle 124 to enable the autonomous vehicle 124 to follow the fallback trajectory.

In some instances, based on determining that the first component 112 is no longer operating correctly (and/or based on determining that the computer system(s) 102 are not operating correctly), the second component 120 can send data to the execution module 116 and/or the fallback determination module 118. The execution module 116 and/or the fallback determination module 118 can then use the second poses to respectively generate routes, instructions, and trajectories for the autonomous vehicle 124. For instance, the fallback determination module 118 can use the real-time processed sensor data and the second poses for planning routes for the autonomous vehicle 124. Additionally, the fallback determination module 118 can use the real-time processed sensor data and the second poses for generating instructions for the autonomous vehicle 124. Furthermore, the fallback determination module 118 can use the real-time processed sensor data and the second poses to generate output trajectories for the autonomous vehicle 124. In some instances, the fallback determination module 118 uses the real-time processed sensor data and the second poses to generate a fallback trajectory that is associated with to a fallback action. The fallback action can correspond a safety maneuver, such as aggressively stopping the autonomous vehicle 124, driving to the shoulder of the road and stopping, or the like.

In at least one example, the execution module 116 and the fallback determination module 118 can have a sixth frequency of operation (e.g., $f_6$) that is different than the route planning module 104, the decision module 106, the trajectory module 108, the first component 112, and/or the second component 120. In at least one example, the execution module 116 and the fallback determination module 118 can operate at a highest frequency to enable the execution module 116 and the fallback determination module 118 to make near real-time decisions.

The tracking module 122 can use the first poses from the first component 112 and/or the second poses from the second component 120 to determine that the vehicle 124 is navigating alone the correct trajectory. For instance, the tracking module 122 can compare the first poses and/or the second poses to data that indicates the current trajectory of the autonomous vehicle 124. In some instances, if the tracking module 122 determines that the autonomous vehicle 124 is not navigating along the current trajectory, the tracking module 122 can send data to at least one of the decision module 106, the trajectory module 108, and/or the fallback determination module 122 that causes the autonomous vehicle 124 to execute a fallback trajectory.

Additional details of the computer system(s) 102 and vehicle control device 114 are provided below in connection with FIG. 7.

As described above, the computer system(s) 102 can be separate and distinct from the vehicle control device 114. In some examples, this configuration can enhance safety, redundancy, and optimization. In some instances, the separation of the computer system(s) 102 from the vehicle control device 114 can be useful for troubleshooting. For instance, a programmer can identify an error, flaw, failure, fault, etc. associated with either the computer system(s) 102 or the vehicle control device 114. For instance, the programmer may determine that the first component 112 is malfunctioning based on the analysis performed by the second component 120. Accordingly, the programmer can troubleshoot either the computer system(s) 102 or the vehicle control device 114, instead of troubleshooting the entire system.

In some examples, though depicted as part of computer system 102 for illustrative purposes, the second component 120 may reside in the vehicle control device 114, or otherwise independent of computer system 102 such that even where computer system 102 fails, the autonomous vehicle 124 may continue to safely navigate a trajectory using the second pose provided by the second component 120.

FIGS. 2-5 illustrate example processes in accordance with instances of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 2:
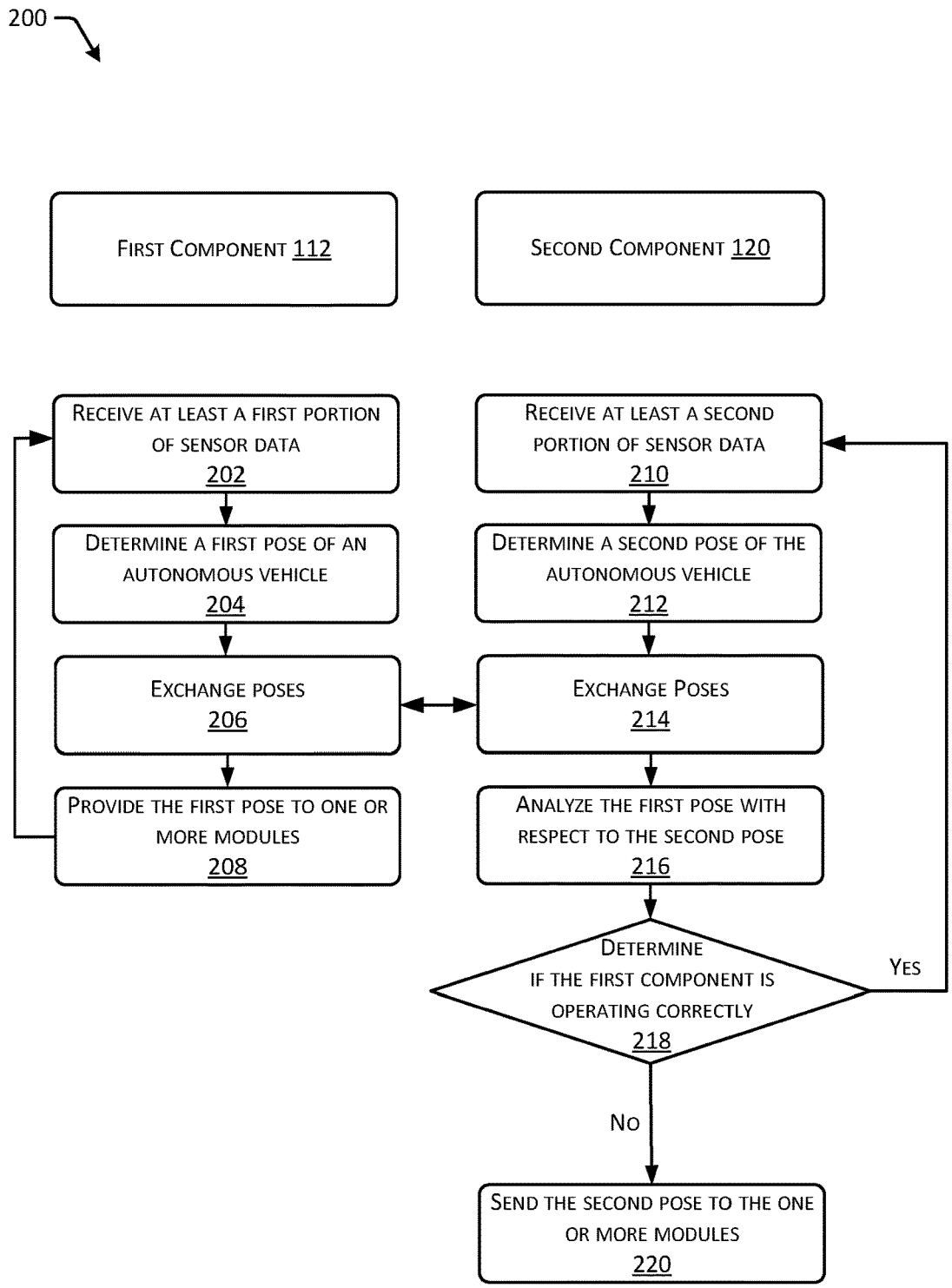
FIG. 2 depicts an example process for performing dual pose generation for an autonomous vehicle.

FIG. 2 depicts an example process 200 for performing dual pose generation for an autonomous vehicle. At 202, a first component 112 (e.g. a first pose estimation unit) receives at least a first portion of sensor data. As discussed above, in some instances, the first component 112 can include a first computing system (e.g. a first pose estimation unit) that determines first poses for an autonomous vehicle. The first component can receive at least a first portion of the sensor data from one or more sensors. For instance, the first sensor can receive LIDAR data from one or more LIDAR sensors and/or vision data from one or more camera sensors.

At 204, the first component 112 determines a first pose of an autonomous vehicle. For instance, the first component 112 can process the first portion of the sensor data using one or more first algorithms to determine first poses of the autonomous vehicle. As discussed above, the first pose of the autonomous vehicle can indicate a first location (e.g., position) and/or first orientation of the autonomous vehicle in a coordinate system (e.g., inertial coordinate system, track based coordinate system, map based coordinate system, etc.).

At 206, the first component 112 exchanges information with a second component 120 (e.g., sends the first pose to the second component 120, receives the second pose from the second component 120, and/or receives information regarding the difference between the two, etc.) and at 208, the first component 112 provides the first pose to one or more modules. For instance, the first component 112 can send the first pose to the second component 120 for analysis to determine if the first component 112 is operating correctly. Additionally, the first component 112 can send the first pose to the one or more modules that utilize the first pose to determine and/or validate routes and/or trajectories for the autonomous vehicle. For instance, the one or more modules can utilize the first pose to generate routes for the autonomous vehicle, validate that the autonomous vehicle is navigating along a current trajectory for the autonomous vehicle, and/or the like. The first component can then continue to perform steps 202-208 in order to update the first poses of the autonomous vehicle as the autonomous vehicle navigates along a route.

At 210, the second component 120 receives a second portion of the sensor data. As discussed above, the second component 120 can include a second computing system (e.g. a second pose estimation unit) that determines second poses for the autonomous vehicle. In some instances, the second component 120 is less computationally-intensive as compared to the first component 112 and as such, uses sensor data that differs from the first portion of the sensor data. For instance, the second portion of the sensor data may include sensor data captured by one or more IMUs and/or one or more GPSs. As such, the first algorithms utilized by the first component 112, which can use sensor data including LIDAR data, image data, and/or the like, may be more computationally-intensive than the second algorithms utilized by the second component 120, which can use sensor data including IMU data, GPS data, and/or the like. Additionally, since the first algorithms are more computationally-intensive, the first poses determine by the first component 112 may be more accurate than the second poses determined by the second component 120.

At 212, the second component determine a second pose for of the autonomous vehicle. For instance, the second component 120 can process the second portion of the sensor data using one or more second algorithms to determine second poses of the autonomous vehicle. As discussed above, the second pose of the autonomous vehicle can indicate a second location (e.g., position) and/or second orientation of the autonomous vehicle in a coordinate system (e.g., inertial coordinate system, track based coordinate system, map based coordinate system, etc.). In some instances, as described above, if the second component 120 uses different algorithm(s) and/or different sensor data to determine poses as compared to the first component 112, the second pose may differ slightly from the first pose.

At 214, the second component 120 exchanges information with the first component 112 (e.g., sends the second pose to the first component 112, receives the first pose from the first component 112, sends information regarding the difference of poses to the first component 112, etc.) and at 216, the second component 120 analyzes the first pose with respect to the second pose. For instance, the second component 120 may compare the first pose to the second pose to determine at least one difference between the first pose and the second pose. The at least one difference can include location difference(s) and/or orientation difference(s), as discussed in detail above. The second component 120 can then compare the at least one difference to at least one threshold to determine if the first pose is accurate. For instance, the second component can compare the Euclidean difference to a threshold in order to determine if the first pose is accurate.

At 218, the second component 120 determines if the first component 112 is operating correctly. For instance, in some examples, based on each of the difference(s) being within a respective threshold, the second component 120 can determine that the first component 112 is operating correctly. In response, the second component 120 can continue to perform steps 210-218. In such an instance, the second component 120 may additionally use the pose provided from the first component 112 to update the second pose based on the first pose. However, in some instances, if at least one of the difference(s) exceeds the respective threshold and/or a pose is not received from the first component 112, then the second component 120 may determine that the first component 112 is not operating correctly. In response, the second component 120 can send data to the one or more modules indicating that the first component 112 is not operating correctly. Additionally, at 220, the second component 120 can send the second pose to the one or more modules. In response, the one or more modules can use the second pose to generate a fallback trajectory for the autonomous vehicle. In some instances, the fallback trajectory may cause the autonomous vehicle to safely stop.

It should be noted that, in some instances, the first component 112 may further utilize the second pose from the second component 120 in order to perform some and/or all of the analysis described above with regard to the first component 120. For instance, the first component 112 can determine if at least one difference between the first pose and the second pose exceeds a respective threshold. Based on the determination, the first component 112 can determine if the second component 120 is operating correctly. Additionally, the first component 112 can use the second pose to determine if the autonomous vehicle is navigating along the correct trajectory. Additional information exchanged between the two components may also be used, for example, to improve localization and tracking (e.g. by updating biases, gains, etc.) or to determine potential sensors which may be faulty (misaligned, miscalibrated, etc) so as to discount their input in computing a pose.

Figure 3:
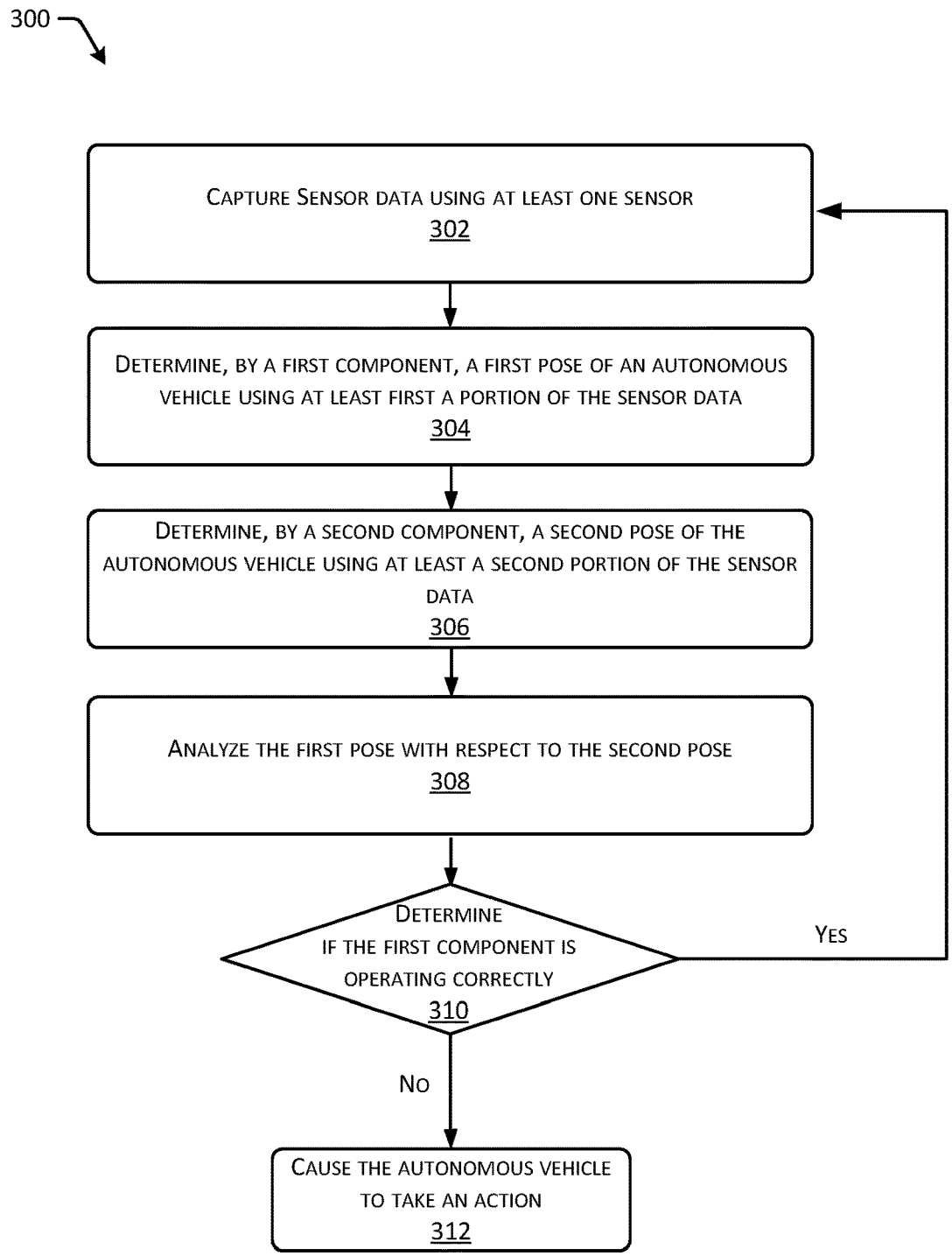
FIG. 3 depicts an example process for using two separate components to perform dual pose generation for an autonomous vehicle.

FIG. 3 depicts an example process 300 for using two separate components to perform dual pose generation for an autonomous vehicle. At 302, the process 300 captures (e.g., generates) sensor data using at least one sensor. For instance, a system associated with an autonomous vehicle may include various types of sensors that capture sensor data associated with the autonomous vehicle. At 304, the process 300 determines, by a first component, a first pose of an autonomous vehicle using at least a first portion of the sensor data. For instance, the first component may include a first computing system that determines the first pose by analyzing the at least the first portion of the sensor data using one or more first algorithms.

At 306, the process 300 determines, by a second component, a second pose of the autonomous vehicle using at least a second portion of the sensor data. For instance, the second component may include a computing system that determines the second pose by analyzing the at least the second portion of the sensor data using one or more second algorithms. In some instances, the at least the first portion of the sensor data includes similar sensor data as the at least the second portion of the sensor data. In other instances, the at least the first portion of the sensor data includes different sensor data as the at least the second portion of the sensor data.

At 308, the process 300 analyzes the first pose with respect to the second pose and at 310, the process 300 determines if the first component is operating correctly. For instance, as discussed above, the system may compare the first pose to the second pose to determine one or more differences between the first pose and the second pose. The one or more differences can include location difference(s) and/or orientation difference(s). The system can then compare each of the one or more differences to a respective threshold. In some instances, based on the comparison, the system can determine that first component is operating correctly when each of the one or more differences is within the respective threshold. In some instances, based on the comparison, the system can determine that the first component is not operating correctly when at least one of the one or more differences exceeds the respective threshold.

If, at 310, the process 300 determines that the first component is operating correctly, then the process 300 repeats starting at 302. However, if at 310, the process 300 determines that the first component is no longer operating correctly, then at 312, the process 300 causes the autonomous vehicle to take an action. For example, the system may determine a fallback trajectory for the autonomous vehicle and cause the autonomous vehicle to navigate along the fallback trajectory.

Figure 4:
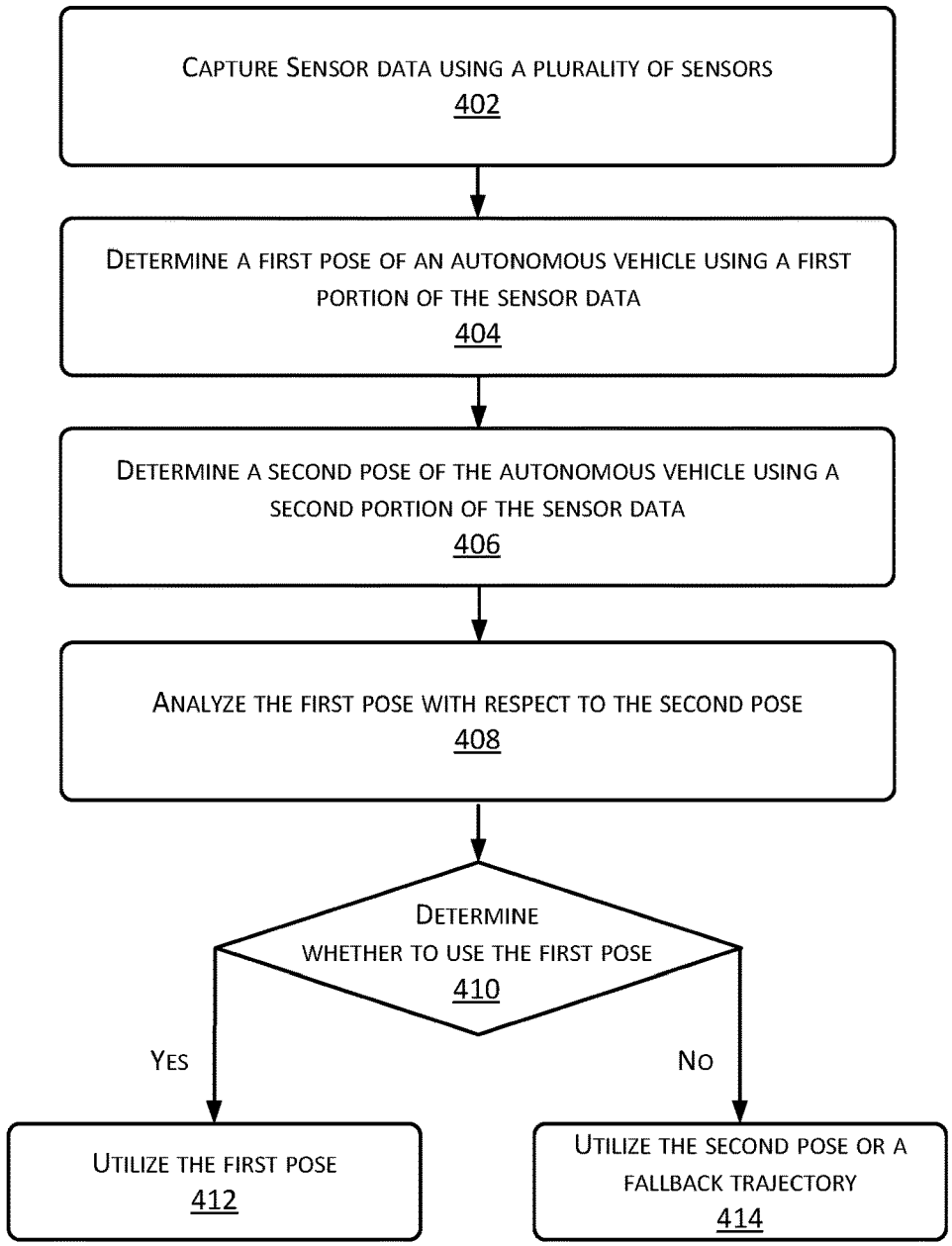
FIG. 4 depicts an example process for performing dual pose generation using different types of sensor data.

FIG. 4 depicts an example process 400 for performing dual pose generation using different types of sensor data. At 402, the process 400 captures sensor data using a plurality of sensors. For instance, a system associated with an autonomous vehicle may include sensors that capture different types of sensor data. At 404, the process 400 determines a first pose of an autonomous vehicle using a first portion of the sensor data. For instance, the system may analyze the first portion of the sensor data using one or more algorithms to determine the first pose of the autonomous vehicle. In some instances, the first portion of the sensor data includes LIDAR data captured by one or more LIDAR sensors, visual data captured by one or more camera sensors, GPS data, IMU data, wheel encoder data, and/or the like.

At 406, the process 400 determines a second pose of the autonomous vehicle using a second portion of the sensor data. For instance, the system may analyze the second portion of the sensor data using one or more second algorithms to determine the second pose of the autonomous vehicle. In some instances, the one or more second algorithms are less computationally-intensive than the one or more first algorithms. As such, the second portion of the sensor data may include sensor data captured by one or more IMUS and/or GPS data captured by one or more GPS sensors. In some instances, the second portion of the sensor data includes a subset of the first portion of the sensor data. In some instances, the second portion of the sensor data is different than the first portion of the sensor data (e.g., different types of data and/or data from different sensors).

At 408, the process 400 analyzes the first pose with respect to the second pose and at 410, the process 400 determines whether to use the first pose to navigate the autonomous vehicle. For instance, as discussed above, the system may determine one or more differences between the first pose and the second pose. The one or more differences can include location difference(s) and/or orientation difference(s). The system can then compare each of the one or more differences to a respective threshold. In some instances, based on the comparison, and at 412, the process 400 can utilize the first pose to navigate the autonomous vehicle when each of the one or more differences is within the respective threshold (e.g., the YES route). In some instances, based on the comparison, and at 414, the process 400 can utilize the second pose to navigate the autonomous vehicle and/or utilize a fallback trajectory when at least one of the one or more differences exceeds the respective threshold.

Figure 5A:
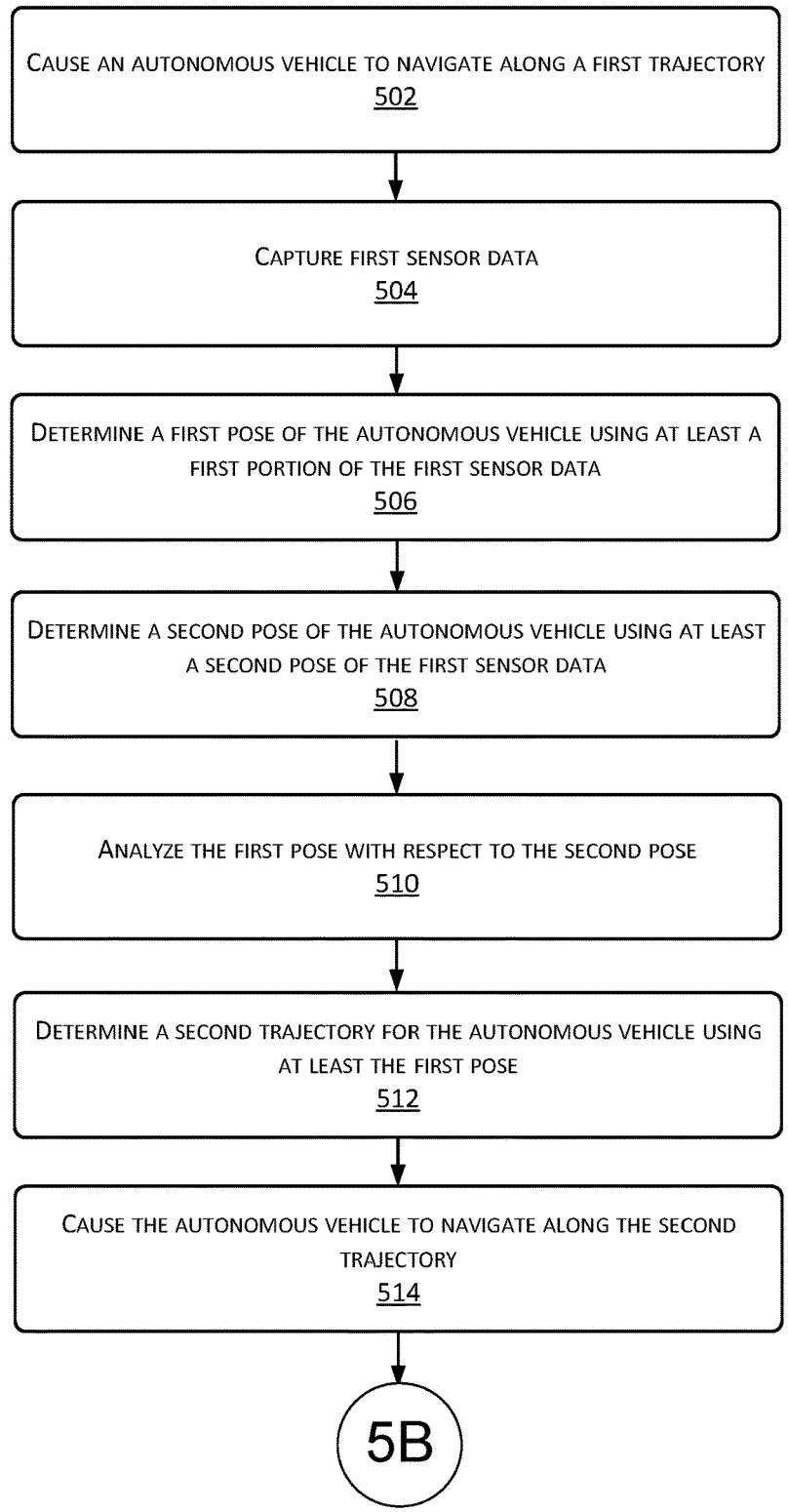
FIGS. 5A-5B depict an example process for utilizing dual pose generation to navigate an autonomous vehicle.
Figure 5B:
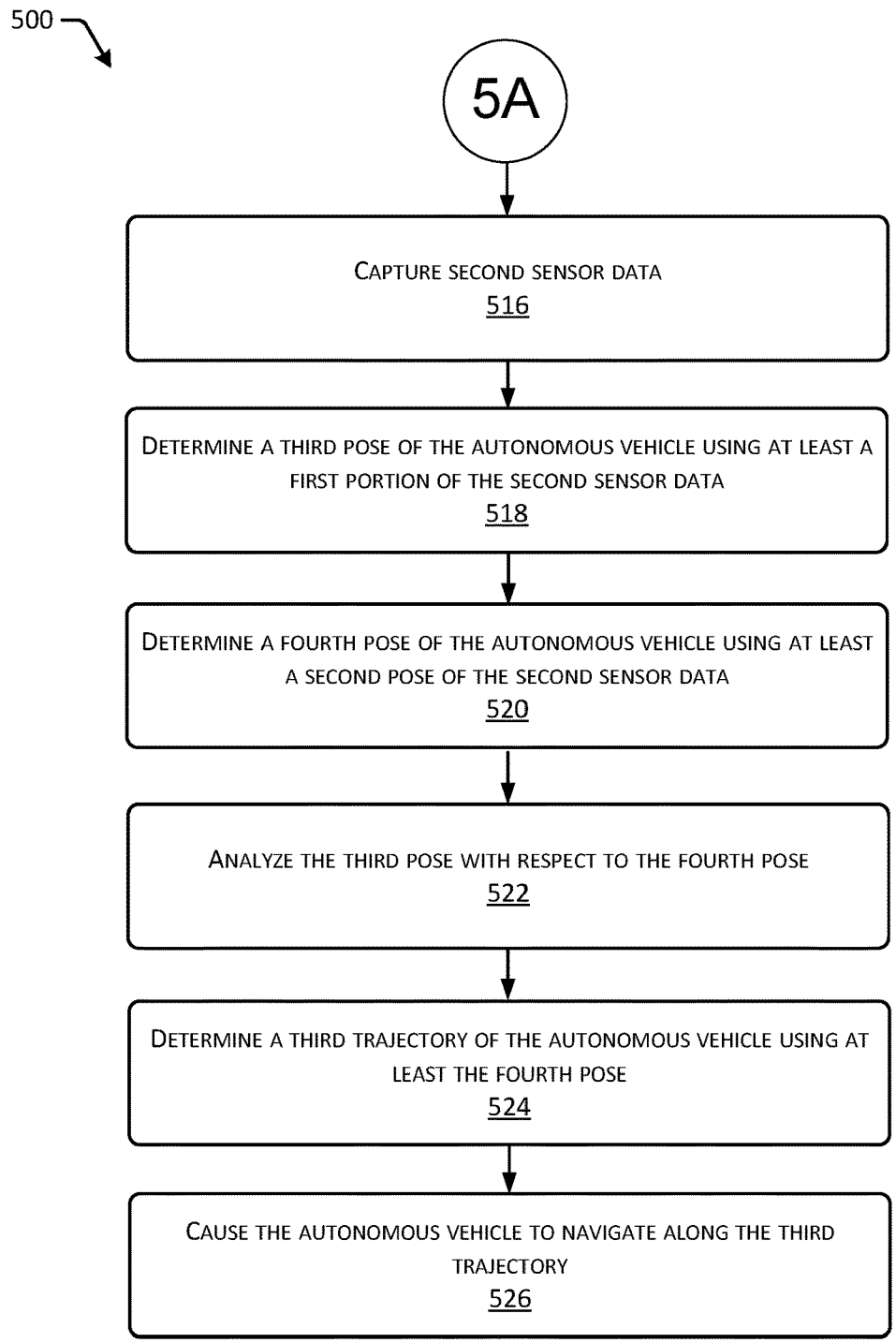

FIGS. 5A-5B depict an example process 500 for utilizing dual pose generation to navigate an autonomous vehicle. At 502, the process 500 causes an autonomous vehicle to navigate along a first trajectory and at 504, the process 500 captures first sensor data. For instance, a system may determine the first trajectory for the autonomous vehicle and then cause the autonomous vehicle to navigate along the first trajectory. While navigating, the system may utilize one or more sensors to capture sensor data associated with the autonomous vehicle.

At 506, the process 500 determines a first pose for the autonomous vehicle using at least a first portion of the first sensor data and at 508, the process 500 determines a second pose of the autonomous vehicle using at least a second portion of the first sensor data. For instance, the system may include a first component, such as a first computing system that determines the first pose of the autonomous vehicle using the at least the first portion of the first sensor data. The system may further include a second component, such as a second computing system, that determines the second pose of the autonomous vehicle using the at least the second portion of the first sensor data. In some instances, the at least the first portion of the first sensor data includes different sensor data than the at least the second portion of the first sensor data.

At 510, the process 500 analyzes the first pose with respect to the second pose, as in any example herein, and at 512, the process 500 determines a second trajectory for the autonomous vehicle using at least the first pose. For instance, the system (e.g., the second component) may compare the first pose to the second pose in order to identify at least one difference between the first pose and the second pose (e.g. a Euclidian difference between the two poses, etc.). The system (e.g., the second component) may then determine that the at least one difference is within at least one threshold. Based on the determination, the system may determine the second trajectory of the autonomous vehicle using the at least first pose of the autonomous vehicle.

In some instances, although not illustrated in the process 500 of FIG. 5, the system can further utilize the first pose and/or the second pose to track the autonomous vehicle. For instance, the system can determine that the autonomous vehicle is navigating along the current trajectory (e.g., the first trajectory) using at least one of the first pose or the second pose.

At 514, the process 500 causes an autonomous vehicle to navigate along the second trajectory and at 516, the process 500 captures second sensor data. For instance, the system may cause the autonomous vehicle to navigate along the second trajectory. While the autonomous vehicle is navigating alone the second trajectory, the system may utilize the one or more sensors to capture second sensor data associated with the autonomous vehicle.

At 518, the process 500 determines a third pose for the autonomous vehicle using at least a first portion of the second sensor data and at 520, the process 500 determines a fourth pose of the autonomous vehicle using at least a second portion of the second sensor data. For instance, the first component may determine the third pose of the autonomous vehicle using the at least the first portion of the second sensor data. Additionally, the second component may determine the fourth pose of the autonomous vehicle using the at least the second portion of the second sensor data. In some instances, the at least the first portion of the second sensor data includes different sensor data than the at least the second portion of the second sensor data. In some examples, the second senor data includes a subset of the first sensor data.

At 522, the process 500 analyzes the third pose with respect to the fourth pose and at 524, the process 500 determines a third trajectory for the autonomous vehicle using at least the fourth pose. For instance, the system (e.g., the second component) may compare the third pose to the fourth pose in order to identify at least one difference between the third pose and the fourth pose (e.g. a Euclidian distance between them, a difference in orientation, etc.). The system (e.g., the second component) may then determine that the at least one difference exceeds at least one threshold or that a third pose was not generated. Based on the determination, the system may determine that the first component is no longer operating properly. In response, the system may determine the third trajectory (e.g., a fallback trajectory) for the autonomous vehicle using the fourth pose.

In some instances, although not illustrated in the process 500 of FIG. 5, the system can further utilize the third pose and/or the fourth pose to track the autonomous vehicle. For instance, the system can determine that the autonomous vehicle is navigating along the current trajectory (e.g., the second trajectory) using at least one of the third pose or the fourth pose.

At 526, the process 500 causes the autonomous vehicle to navigate along the third trajectory. In some instances, causing the autonomous vehicle to navigate along the third trajectory can include causing the autonomous vehicle to slow to a safe stop. In some instances, the second component can continue to determine poses of the autonomous vehicle, and the system can continue to determine trajectories for the vehicle using the poses, until the autonomous vehicle comes to the safe stop. In such instances, the autonomous vehicle may be capable of performing complex maneuvers, such as changing lanes to move to the side of the road, etc.

Figure 6A:
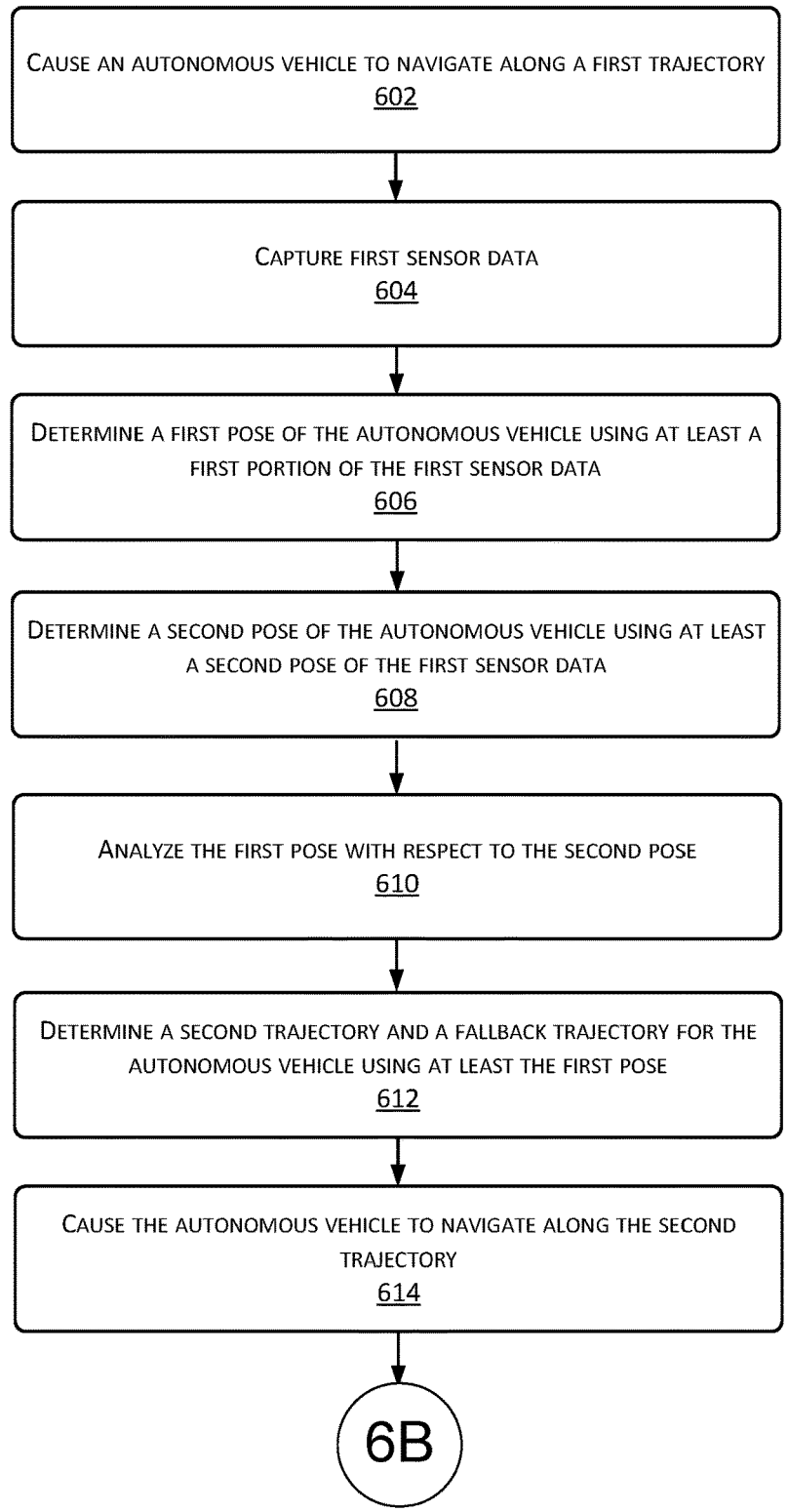
FIGS. 6A-6B depict an example process for utilizing dual pose generation to navigate an autonomous vehicle based on a fallback trajectory.
Figure 6B:
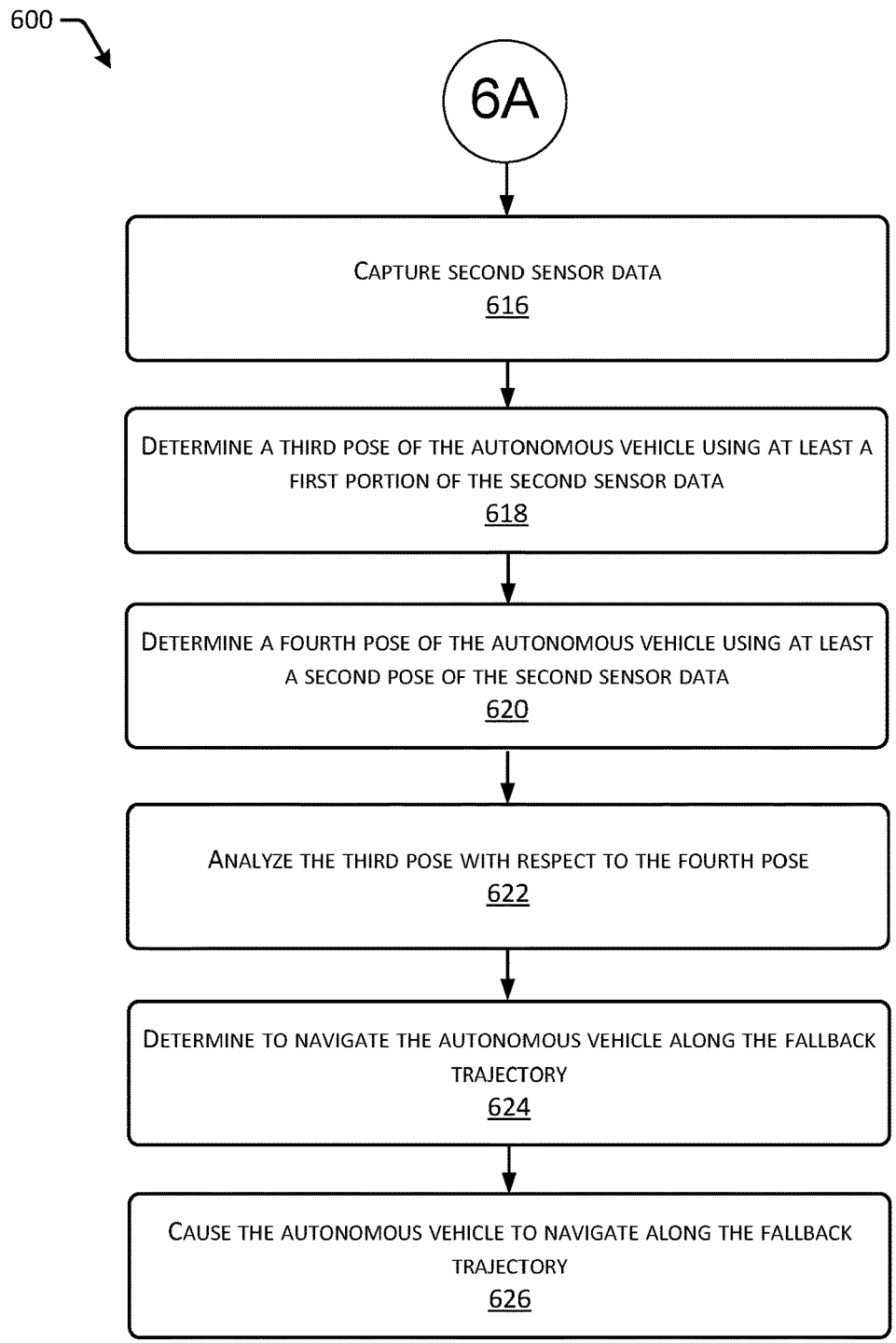

FIGS. 6A-6B depict an example process 600 for utilizing dual pose generation to navigate an autonomous vehicle based on a fallback trajectory. At 602, the process 600 causes an autonomous vehicle to navigate along a first trajectory and at 604, the process 600 captures first sensor data. For instance, a system may determine the first trajectory for the autonomous vehicle and then cause the autonomous vehicle to navigate along the first trajectory. While navigating, the system may utilize one or more sensors to capture sensor data associated with the autonomous vehicle.

At 606, the process 600 determines a first pose for the autonomous vehicle using at least a first portion of the first sensor data and at 608, the process 600 determines a second pose of the autonomous vehicle using at least a second portion of the first sensor data. For instance, the system may include a first component, such as a first computing system that determines the first pose of the autonomous vehicle using the at least the first portion of the first sensor data. The system may further include a second component, such as a second computing system, that determines the second pose of the autonomous vehicle using the at least the second portion of the first sensor data. In some instances, the at least the first portion of the first sensor data includes different sensor data than the at least the second portion of the first sensor data. In some examples, the second sensor data may comprise a subset of the first sensor data.

At 610, the process 600 analyzes the first pose with respect to the second pose, as in any example herein, and at 612, the process 600 determines a second trajectory and a fallback for the autonomous vehicle using at least the first pose. For instance, the system (e.g., the second component) may compare the first pose to the second pose in order to identify at least one difference between the first pose and the second pose (e.g. a Euclidian difference between the two poses, etc.). The system (e.g., the second component) may then determine that the at least one difference is within at least one threshold. Based on the determination, the system may determine the second trajectory of the autonomous vehicle using at least the first pose of the autonomous vehicle. Additionally, the autonomous vehicle can determine the fallback trajectory using at least the first pose.

At 614, the process 600 causes an autonomous vehicle to navigate along the second trajectory and at 616, the process 600 captures second sensor data. For instance, the system may cause the autonomous vehicle to navigate along the second trajectory. While the autonomous vehicle is navigating alone the second trajectory, the system may utilize the one or more sensors to capture second sensor data associated with the autonomous vehicle.

At 618, the process 600 determines a third pose for the autonomous vehicle using at least a first portion of the second sensor data and at 620, the process 600 determines a fourth pose of the autonomous vehicle using at least a second portion of the second sensor data. For instance, the first component may determine the third pose of the autonomous vehicle using the at least the first portion of the second sensor data. Additionally, the second component may determine the fourth pose of the autonomous vehicle using the at least the second portion of the second sensor data. In some instances, the at least the first portion of the second sensor data includes different sensor data than the at least the second portion of the second sensor data. In some examples, the second senor data includes a subset of the first sensor data.

At 622, the process 600 analyzes the third pose with respect to the fourth pose and at 624, the process 600 determines to navigate the autonomous vehicle along the fallback trajectory. For instance, the system (e.g., the second component) may compare the third pose to the fourth pose in order to identify at least one difference between the third pose and the fourth pose (e.g. a Euclidian distance between them, a difference in orientation, etc.). The system (e.g., the second component) may then determine that the at least one difference exceeds at least one threshold or that a third pose was not generated. Based on the determination, the system may determine that the first component is no longer operating properly. In response, the system may determine to use the fallback trajectory previously determined by the first component.

At 626, the process 600 causes the autonomous vehicle to navigate along the fallback trajectory. In some instances, causing the autonomous vehicle to navigate along the fallback trajectory can include causing the autonomous vehicle to slow to a safe stop. In some instances, the second component can continue to determine poses of the autonomous vehicle, and the system can continue to determine trajectories for the vehicle using the poses, until the autonomous vehicle comes to the safe stop. In such instances, the autonomous vehicle may be capable of performing complex maneuvers, such as changing lanes to move to the side of the road, etc.

Figure 7:
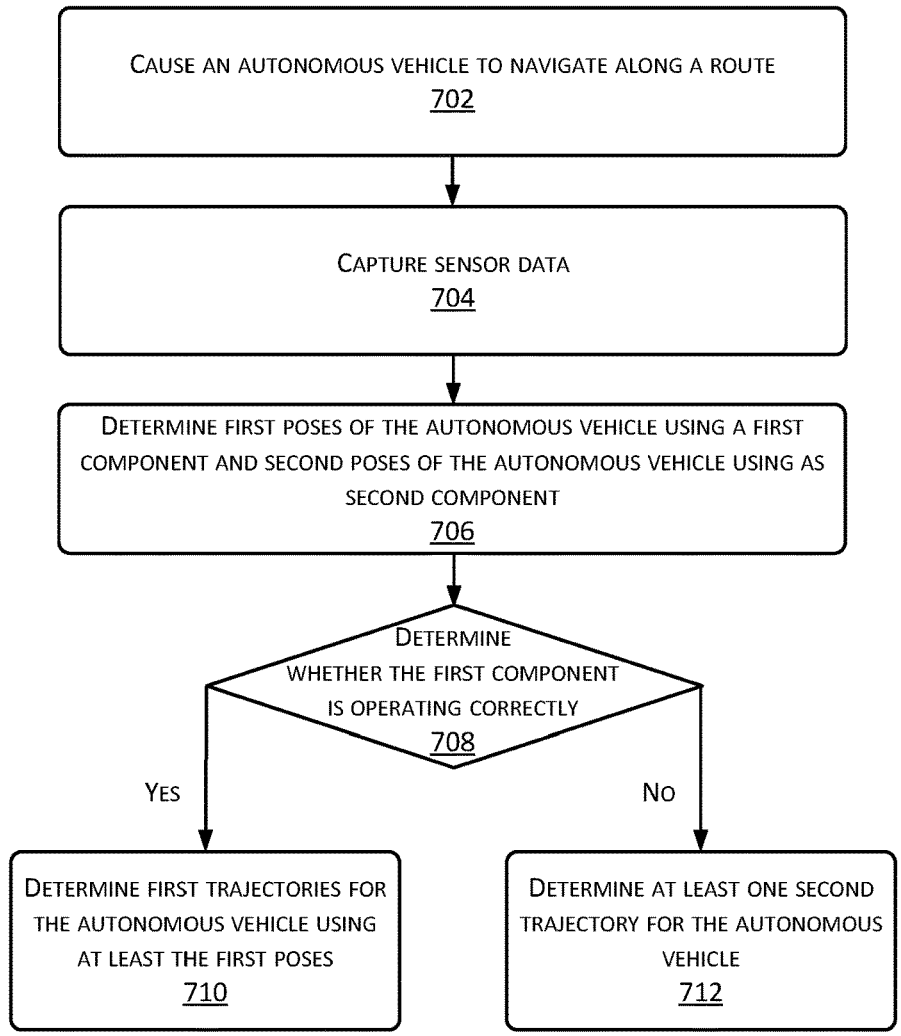
FIG. 7 depicts an example process for utilizing dual pose generation to navigate an autonomous vehicle when one of the components fails.

FIG. 7 depicts an example process 700 for utilizing dual pose generation to navigate an autonomous vehicle when one of the components fails. At 702, the process 700 causes an autonomous vehicle to navigate along a route and at 704, the process 700 captures sensor data. For instance, a system may determine the route for the autonomous vehicle, where the route is from a first location to a second location. The system may then cause the autonomous vehicle to navigate along the route. While navigating, the system may utilize one or more sensors to capture sensor data associated with the autonomous vehicle.

At 706, the process 700 determines first poses of the autonomous vehicle using a first component and second poses of the autonomous vehicle using a second component. For instance, the system may include a first component (e.g., first computing system) that determines the first poses for the autonomous vehicle using at least a portion of the sensor data. Additionally, the system may include a second component (e.g., second computing system) that determines the second poses using at least a portion of the sensor. In some instances, the first component and the second component use similar sensor data to respectively determine the first poses and the second poses. In some instances, the first component and the second component use different sensor data to respectively determine the first poses and the second poses.

In some instances, the second pose is generated based on a subset of the sensor data used to generate the first pose.

At 708, the process 700 determines whether the first component is operating correctly using the first poses and the second poses. For instance, the system can compare the first poses to the second poses to determine whether a difference (e.g., any of the differences described above) between the first poses and the second poses exceeds a threshold. The system can then determine that the first component is not operating correctly when the difference exceeds the threshold (which may include those instances in which the first component has not determined a valid pose), and determine that the first component is operating correctly when the difference is within the threshold.

At 710, based on determining the first component is operating correctly, the process 700 determines first trajectories for the autonomous vehicle using at least the first poses. For instance, the system may determine that the first component is operating correctly based on the first component determining the first poses and/or based on the analysis between the first poses and the second poses. In response, the system may utilize the first poses to determine the first trajectories for the autonomous vehicle. In some instances, the first trajectories cause the autonomous vehicle to navigate along the route.

At 712, based on the first component not operating correctly, the process 700 determines at least one second trajectory for the autonomous vehicle. For instance, the system (e.g., the second component) may determine that the first component has malfunctioned based on the first component no longer determining the first poses. In response, and in some examples, the system can utilize at least one of the second poses determined by the second component to determine at least one second trajectory for the autonomous vehicle. In some examples, the system can utilize a fallback trajectory previously determined by the first component as the at least one second trajectory. In some instances, the at least one second trajectory causes the autonomous vehicle to safely come to a stop.

Figure 8:
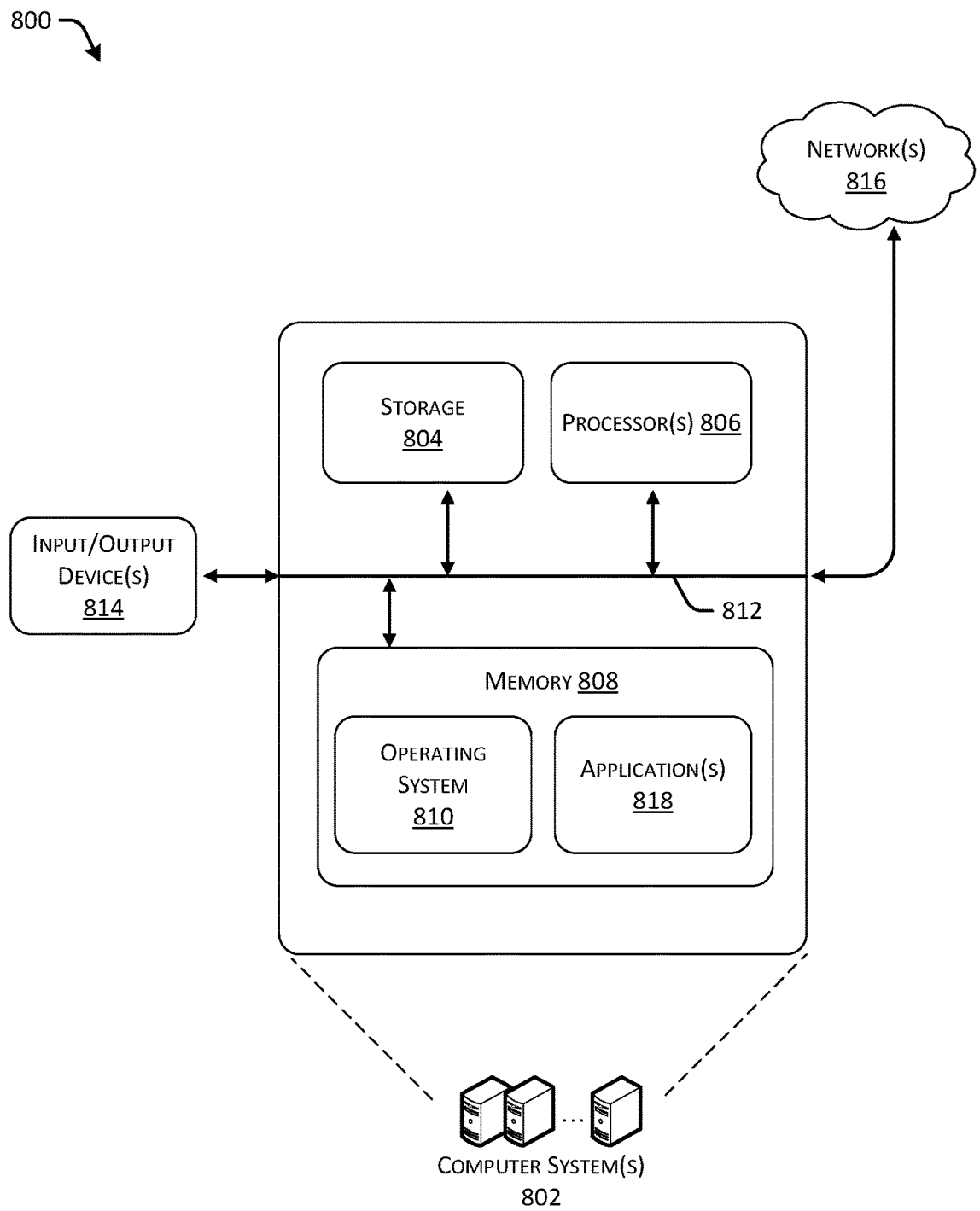
FIG. 8 depicts a block diagram of an example computer system for implementing the techniques described herein.

FIG. 8 illustrates additional details associated with an architecture for trajectory planning and execution, as described above with reference to FIG. 1. FIG. 8 illustrates an environment 800 in which the disclosures can be implemented in whole or in part. The environment 800 depicts one or more computer systems 802 that comprise a storage 804, one or more processor(s) 806, a memory 808, and an operating system 810. The storage 804, the processor(s) 806, the memory 808, and the operating system 810 can be communicatively coupled over a communication infrastructure 812. Optionally, the computer system(s) 802 can interact with a user, or environment, via input/output (I/O) device(s) 814, as well as one or more other computer system(s) over a network 816, via the communication infrastructure 812. The operating system 810 can interact with other components to control one or more applications 818.

In at least one example, the computer system(s) 802 illustrated in FIG. 8 may be distributed. In some instances, at least a portion of the computer system(s) 802 can correspond to the computer system(s) 102 described above with reference to FIG. 1. Further, the computer system(s) 802 can implement any hardware and/or software to implement the modules 104, 106, and 108 and the components 112 and 120 to perform dual pose generation and trajectory planning, as discussed herein. Additionally, at least a portion of the computer system(s) 802 can correspond to the vehicle control device 114 described above with reference to FIG. 1. Further, the computer system(s) 802 can implement any hardware and/or software to implement the modules 116 and 118 to perform trajectory execution, as discussed herein.

The systems and methods described herein can be implemented in software or hardware or any combination thereof. The systems and methods described herein can be implemented using one or more computer system(s) which may or may not be physically or logically separate from each other. The methods can be performed by components arranged as either on-premise hardware, on-premise virtual systems, or hosted-private instances. Additionally, various aspects of the methods described herein can be combined or merged into other functions.

With reference to the computer system(s) illustrated in FIG. 8, a processor or computer system can be configured to particularly perform some or all of the methods described herein. In some instances, the methods can be partially or fully automated by one or more computers or processors. The systems and methods described herein can be implemented using a combination of any of hardware, firmware and/or software. The present systems and methods described herein (or any part(s) or function(s) thereof) can be implemented using hardware, software, firmware, or a combination thereof and can be implemented in one or more computer systems or other processing systems. In some instances, the illustrated system elements could be combined into a single hardware device or separated into multiple hardware devices. If multiple hardware devices are used, the hardware devices could be physically located proximate to or remotely from each other. The instances of the methods described and illustrated are intended to be illustrative and not to be limiting. For example, some or all of the steps of the methods can be combined, rearranged, and/or omitted in different instances.

In one or more instances, the systems and methods described herein can be directed toward one or more computer systems capable of carrying out the functionality described herein. Example computer system(s)s can be, but are not limited to, a personal computer (PC) system running any operating system such as, but not limited to, OS X™, iOS™, Linux™, Android™, and Microsoft™ Windows™. However, the systems and methods described herein may not be limited to these platforms. Instead, the systems and methods described herein can be implemented on any appropriate computer system running any appropriate operating system. Other components of the systems and methods described herein, such as, but not limited to, a computer system(s), a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., can also be implemented using a computer system(s). Services can be provided on demand using, e.g., but not limited to, an interactive television (iTV), a video on demand system (VOD), and via a digital video recorder (DVR), or other on demand viewing system.

The computer system(s) can include one or more processors. The processor(s) can be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computer system(s) can include a display interface that can forward graphics, text, and other data from the communication infrastructure for display on a display unit.

The computer system(s) can also include, but is not limited to, a main memory, random access memory (RAM), and a secondary memory, etc. The secondary memory can include, for example, a hard disk drive and/or a removable storage drive, such as a compact disc drive CD-ROM, etc. The removable storage drive can read from and/or written to a removable storage unit. As can be appreciated, the removable storage unit can include a computer usable storage medium having stored therein computer software and/or data. In some instances, a machine-accessible medium can refer to any storage device used for storing data accessible by a computer. Examples of a machine-accessible medium can include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor can also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The computer system(s) 802 can be in communication with a computerized data storage system. The data storage system can include a non-relational or relational data store, such as a MySQL™ or other relational database. Other physical and logical database types could be used. The data store can be a database server, such as Microsoft SQL Server™, Oracle™, IBM DB2™, SQLITE™, or any other database software, relational or otherwise. The data store can store the information identifying syntactical tags and any information required to operate on syntactical tags. In some instances, the processing system can use object-oriented programming and can store data in objects. In these instances, the processing system can use an object-relational mapper (ORM) to store the data objects in a relational database. The systems and methods described herein can be implemented using any number of physical data models. In one example instance, a relational database management system (RDBMS) can be used. In those instances, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative example instances, secondary memory can include other similar devices for allowing computer programs or other instructions to be loaded into computer system. Such devices can include, for example, a removable storage unit and an interface. Examples of such can include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which can allow software and data to be transferred from the removable storage unit to computer system.

The computer system(s) 802 can also include an input device such as, but not limited to, a voice input device, such as a microphone, touch screens, gesture recognition devices, such as cameras, other natural user interfaces, a mouse or other pointing device such as a digitizer, and a keyboard or other data entry device. The computer system(s) 802 can also include output devices, such as but not limited to, a display, and a display interface. The computer system(s) 802 can include input/output (I/O) devices such as but not limited to a communications interface, cable and communications path, etc. These devices can include, but are not limited to, a network interface card, and modems. Communications interface(s) can allow software and data to be transferred between a computer system and one or more external devices.

In one or more instances, the computer system(s) 802 can be operatively coupled to an automotive system. Such automotive system can be either manually operated, semi-autonomous, or fully autonomous. In such an instance, input and output devices can include one or more image capture devices, controllers, microcontrollers, and/or other processors to control automotive functions such as, but not limited to, acceleration, braking, and steering. Further, communication infrastructure in such instances can also include a Controller Area Network (CAN) bus.

In one or more instances, the computer system(s) 802 can be operatively coupled to any machine vision based system. For example, such machine based vision systems include but are not limited to manually operated, semi-autonomous, or fully autonomous industrial or agricultural robots, household robot, inspection system, security system, etc. That is, the instances described herein are not limited to one particular context and can be applicable to any application utilizing machine vision.

In one or more instances, the techniques described herein can be practiced in the environment of a computer network or networks. The network can include a private network, or a public network (for example the Internet, as described below), or a combination of both. The network can include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An example computer and/or telecommunications network environment in accordance with the present instances can include nodes, which can include hardware, software, or a combination of hardware and software. The nodes can be interconnected via a communications network. Each node can include one or more processes, executable by processors incorporated into the nodes. A single process can be run by multiple processors, or multiple processes can be run by a single processor, for example. Additionally, each of the nodes can provide an interface point between network and the outside world, and can incorporate a collection of sub-networks.

In one or more instances, the processes can communicate with one another through interprocess communication pathways supporting communication through any communications protocol. The pathways can function in sequence or in parallel, continuously or intermittently. The pathways can use any of the communications standards, protocols or technologies, described herein with respect to a communications network, in addition to standard parallel instruction sets used by many computers.

The nodes can include any entities capable of performing processing functions. Examples of such nodes that can be used with the instances include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes can be made possible by a communications network. A node can be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present instances, the communications network can be a private network (for example, a VPN) or a public network (for example, the Internet).

A non-inclusive list of example wireless protocols and technologies used by a communications network can include Bluetooth™, general packet radio service (GPRS), cellular digital packet data (CDPD), mobile solutions platform (MSP), multimedia messaging (MIMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An example non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Instances of the present disclosure can include apparatuses for performing the operations herein. An apparatus can be specially constructed for the desired purposes, or it can comprise general purpose computer system(s) selectively activated or reconfigured by a program stored in the computer system(s).

In one or more instances, the present instances are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the instances can include a machine-readable medium having instructions stored on it. The instructions can be used to program any processor or processors (or other electronic devices) to perform a process or method according to the present example instances. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals can be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters can also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP can be used in implementing interfaces between programming modules. The components and functionality described herein can be implemented on any desktop operating system executing in a virtualized or non-virtualized environment, using any programming language suitable for software development, including, but not limited to, different versions of Microsoft Windows™, Apple™ Mac™, iOS™, Unix™/ X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor can receive and store instructions and data from a computerized data storage device such as a read-only memory, a random access memory, both, or any combination of the data storage devices described herein. A processor can include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in computer system(s) that includes a back-end component, such as a data server, or that includes a middleware component, such as an application server or an Internet server, or that includes a front-end component, such as a client computer having a graphical user interface or an Internet browser, or any combination of them. The components of the computer system(s) can be connected by any form or medium of digital data communication such as a communication network. Examples of communication networks include, e.g., a LAN, a WAN, and the computers and networks that form the Internet.

One or more instances of the present disclosure can be practiced with other computer system configurations, including hand-held devices, microprocessor systems, microprocessor-based or programmable consumer electronics, minicomputers, mainframe computers, etc. The systems and methods described herein can also be practiced in distributed computing environments where tasks are performed by remote processing devices that are linked through a network.

The terms "computer program medium" and "computer readable medium" can be used to generally refer to media such as but not limited to removable storage drive, a hard disk installed in hard disk drive. These computer program products can provide software to computer system. The systems and methods described herein can be directed to such computer program products.

References to "one instance," "an instance," "example instance," "some instances," "an instance," "various instances," "one or more instances," etc., can indicate that the example(s) of the present disclosure can include a particular feature, structure, or characteristic, but not every instance necessarily includes the particular feature, structure, or characteristic. Further, repeated use of the phrase "in some instances," or "in an instance," does not necessarily refer to the same example, although they can. Similarly, references to "instances" can indicate that various instance(s) of the present disclosure can include a particular feature, structure, or characteristic, but not every instance necessarily includes the particular feature, structure, or characteristic.

In the description and claims, the terms "coupled" and "connected," along with their derivatives, can be used. It should be understood that these terms can be not intended as synonyms for each other. Rather, in particular instances, "connected" can be used to indicate that two or more elements are in direct physical or electrical contact with each other. "Coupled" can mean that two or more elements are in direct physical or electrical contact. However, "coupled" can also mean that two or more elements are not in direct contact with each other, but yet still co-operate or interact with each other.

An algorithm can be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it can be appreciated that throughout the specification terms such as "processing," "computing," "calculating," "determining," "generating," "analyzing," "comparing," or the like, refer to the action and/or processes of a computer or computer system, or similar electronic computer system(s), that manipulate and/ or transform data represented as physical, such as electronic, quantities within the computer system's registers and/or memories into other data similarly represented as physical quantities within the computer system's memories, registers or other such information storage, transmission or display devices.

In a similar manner, the term "processor" can refer to any device or portion of a device that processes electronic data from registers and/or memory to transform that electronic data into other electronic data that can be stored in registers and/or memory. As non-limiting examples, "processor" can be a Central Processing Unit (CPU) or a Graphics Processing Unit (GPU). A "computing platform" can comprise one or more processors. As used herein, "software" processes can include, for example, software and/or hardware entities that perform work over time, such as tasks, threads, and intelligent agents. Also, each process can refer to multiple processes, for carrying out instructions in sequence or in parallel, continuously or intermittently. The terms "system" and "method" are used herein interchangeably insofar as the system can embody one or more methods and the methods can be considered as a system.

While one or more instances have been described, various alterations, additions, permutations and equivalents thereof are included within the scope of the disclosure.

In the description, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other instances using alternative orderings of the computations could be readily implemented. In addition to being reordered, the computations could also be decomposed into sub-computations with the same results.

Although the discussion above sets forth example implementations of the described techniques, other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

Example Clauses

A: A system embedded in a vehicle, the system comprising: one or more sensors configured to generate sensor data; a first pose estimation unit configured to determine, based at least in part on at least a first portion of the sensor data, a first pose of the vehicle; a second pose estimation unit configured to: determine, based at least in part on at least a second portion of the sensor data, a second pose of the autonomous vehicle; and determine a difference between the first pose and the second pose; one or more modules configured to generate, based at least in part on the difference between the first pose and the second pose, a trajectory for the autonomous vehicle; and one or more modules configured to cause the vehicle to follow the trajectory.

B: The system as paragraph A recites, wherein the sensor data comprises one or more of lidar data, IMU data, GPS data, wheel encoder data, or camera data.

C: The system as paragraph B recites, wherein the at least the second portion of the sensor data is a subset of the at least the first portion of the sensor data.

D: The system as any one of paragraphs A-C recite, wherein: the difference is determined based on one or more of a Euclidian distance or a Mahalanobis distance between the first pose and the second pose, and the second pose estimation unit is further configured to: determine that the difference meets a threshold, and wherein the trajectory is generated based on the second pose.

E: The system as any one of paragraphs A-D recite, wherein: the difference is determined based on one or more of a Euclidian distance or a Mahalanobis distance between the first pose and the second pose, and the second pose estimation unit is further configured to: determine that the difference does not meet a threshold, and wherein the trajectory is generated based on the first pose.

F: The system as any one of paragraphs A-E recite, wherein the second pose estimation unit is further configured to update the second pose based at least in part on the first pose.

G: The system as any one of paragraphs A-F recite, wherein: the first pose estimation unit operates at a first operational frequency to determine one or more first poses of the autonomous vehicle, the one or more first poses including the first pose; the second pose estimation unit operates at a second operational frequency to determine one or more second poses of the autonomous vehicle, the one or more second poses including the second pose; and the first operational frequency differs from the second operational frequency.

H: The system as any one of paragraphs A-G recite, wherein: determining the difference between the first pose and the second pose comprises determining one or more of a distance between the first and second pose or a difference in an orientation of the first and second pose; and determining that the difference meets the threshold comprises determining that the distance meets a location threshold or the difference in an orientation meets an orientation threshold.

I: A method comprising: receiving sensor data from a plurality of sensors disposed about an autonomous vehicle; determining a first pose of the autonomous vehicle based at least in part on a first portion of the sensor data; determining a second pose of the autonomous vehicle based at least in part on a second portion of the sensor data; determining a difference between the first pose and the second pose; generating a trajectory based at least in part on the difference and one or more of the first pose or the second pose; and causing an autonomous vehicle to navigate along the trajectory based at least in part on determining the difference.

J: The method as paragraph I recites, wherein: the first portion of the sensor data comprises one or more of lidar data, camera data, GPS data, or IMU data; and the second portion of sensor data comprises a subset of the first portion of the sensor data.

K: The method as either paragraph I or paragraph J recites, wherein: the first pose is determined with a first pose estimation unit; the second pose is determined with a second pose estimation unit; and the second pose estimation unit being remote from and having less computational resources than the first pose estimation unit.

L: The method as paragraph K recites, further comprising: determining that the difference is equal to or less than a threshold; and updating the second pose estimation unit based at least in part on the first pose, wherein the trajectory is based on the first pose such that the autonomous vehicle continues along a previous trajectory.

M: The method as any one of paragraphs I-L recite, further comprising: determining that a first pose estimation unit has not generated a first pose; wherein the trajectory is based at least in part on the second pose and causes the vehicle to perform a safe stop maneuver.

N: The method as any one of paragraphs I-M recite, further comprising: determining that the difference meets or exceeds a threshold, wherein the trajectory is based at least in part on the second pose and causes the vehicle to perform a safe stop maneuver.

O: The method as any one of paragraphs I-N recite, wherein: determining the first pose of the autonomous vehicle comprises processing the first portion of the sensor data using one or more first algorithms to determine the first pose; and determining the second pose of the autonomous vehicle comprises processing the second portion of the sensor data using one or more second algorithms to determine the second pose, the one or more second algorithms being different than the one or more first algorithms.

P: The method as any one of paragraphs I-O recite, wherein the one or more first algorithms are more computationally-intensive than the one or more second algorithms, and wherein the first portion of the sensor data includes different sensor data than the second portion of the sensor data.

Q: A system comprising: one or more sensors to generate sensor data; one or more processors; and one or more computer-readable media storing instructions that, when executed by the one or more processors, cause the one or more processors to perform operations comprising: causing a vehicle to navigate along a first trajectory; determining, based at least in part on at least a first portion of the sensor data, a first pose of the autonomous vehicle; determining, based at least in part on at least a second portion the sensor data, a second pose of the autonomous vehicle; comparing the first pose to the second pose; based at least in part on comparing the first pose to the second pose, determining a second trajectory for the autonomous vehicle using the first pose or the second pose; and causing the autonomous vehicle to navigate along the second trajectory.

R: The system as paragraph Q recites, the operations further comprising: determining, based at least in part on comparing the first pose to the second pose, a difference between the first pose and the second pose; and determining that the difference exceeds a threshold, wherein determining the second trajectory for the autonomous vehicle comprises determining, based at least in part on the difference exceeding the threshold, the second trajectory for the autonomous vehicle using the second pose, and further wherein the second trajectory comprises a safe stop maneuver.

S: The system as either paragraph Q or paragraph R recites, further comprising: a first component; and a second component, wherein determining the first pose comprises determining, by the first component, the first pose of the autonomous vehicle at a first frequency, and wherein determining the second pose comprises determining, by the second component, the second pose of the autonomous vehicle at a second frequency, the second component being physically separated from the first component.

T: The system as any one of paragraphs Q-S recite, wherein the first portion of data comprises one or more of lidar data, camera data, IMU data, or GPS data and the second sensor data comprises a smaller subset of the first sensor data.

While the example clauses described above are described with respect to one particular implementation, it should be understood that, in the context of this document, the content of the example clauses can also be implemented via a method, device, system, and/or computer storage media.

What is claimed is:

1. A method comprising:
   receiving sensor data associated with a vehicle;
   determining, based at least in part on a first portion of the sensor data, a first pose of the vehicle;
   determining, based at least in part on a second portion of the sensor data, a second pose of the vehicle, the second portion differing from the first portion;
   determining a difference between the first pose and the second pose;
   determining, based at least in part on the difference, a trajectory for the vehicle; and
   controlling the vehicle to navigate in an environment according to the trajectory, wherein the trajectory is generated based on the second pose when determining that the difference meets or exceeds a threshold, or the trajectory is generated based on the first pose when determining that the difference does not meet the threshold.

2. The method as recited in claim 1, further comprising:
   updating, based at least in part on the difference, at least one of the first pose or the second pose based at least in part on the other of the first pose or the second pose.

3. The method as recited in claim 1, wherein the trajectory is a first trajectory associated with a first time, and the method further comprises:
   causing, prior to receiving the sensor data, the vehicle to navigate in the environment according to a second trajectory associated with a second time, the second trajectory being different from the first trajectory and the second time being different from the first time.

4. The method as recited in claim 1, wherein:
   determining the first pose comprises determining the first pose according to a first frequency of operation; and
   determining the first pose comprises determining the second pose according to a second frequency of operation different from the first frequency of operation.

5. The method as recited in claim 1, wherein determining the difference between the first pose and the second pose comprises:
   determining a distance between the first pose and the second pose; and
   determining that the distance meets or exceeds a threshold distance.

6. The method as recited in claim 1, wherein determining the difference between the first pose and the second pose comprises:
   determining a difference in an orientation of the first pose and the second pose; and
   determining that the orientation meets or exceeds a pose threshold.

7. The method as recited in claim 1, wherein:
   the sensor data comprises one or more of lidar data, inertial measurement unit (IMU) data, global positioning system (GPS) data, wheel encoder data, or camera data; and
   the second portion of the sensor data is a subset of the first portion of the sensor data.

8. The method as recited in claim 7, wherein:
   the first pose is determined with a first component;
   the second pose is determined with a second component; and
   the second component being physically separated from the first component and comprising a different amount of computational resources than the first component.

9. The method as recited in claim 1, wherein determining the difference between the first pose and the second pose is based on one or more of a Euclidian distance or a Mahalanobis distance between the first pose and the second pose.

10. A system comprising:
    one or more processors; and
    one or more non-transitory computer-readable media that, when executed by the one or more processors, cause the system to perform operations comprising:
    receiving sensor data associated with a vehicle;
    determining, based at least in part on a first portion of the sensor data, a first pose of the vehicle;
    determining, based at least in part on a second portion of the sensor data, a second pose of the vehicle;
    determining a difference between the first pose and the second pose;
    determining, based at least in part on the difference, a trajectory for the vehicle; and
    controlling the vehicle to navigate in an environment according to the trajectory, wherein the trajectory is generated based on the second pose when determining that the difference meets or exceeds a threshold, or the trajectory is generated based on the first pose when determining that the difference does not meet the threshold.

11. The system as recited in claim 10, wherein:
determining the first pose of the vehicle comprises processing the first portion of the sensor data using one or more first algorithms to determine the first pose; and
determining the second pose of the vehicle comprises processing the second portion of the sensor data using one or more second algorithms to determine the second pose, the one or more second algorithms being different than the one or more first algorithms.

12. The system as recited in claim 10, wherein determining the difference between the first pose and the second pose comprises:
determining a distance between the first pose and the second pose; and
determining that the distance meets or exceeds a threshold distance.

13. The system as recited in claim 10, wherein determining the difference between the first pose and the second pose comprises:
determining a difference in an orientation of the first pose and the second pose; and
determining that the orientation meets or exceeds a pose threshold.

14. The system as recited in claim 10, the operations further comprising:
determining that the difference is equal to or less than a threshold distance or a pose threshold; and
updating the second pose based at least in part on the first pose.

15. One or more non-transitory computer-readable media storing executable instructions that, when executed by one or more processors, cause the one or more processors to perform operations comprising:
receiving sensor data associated with a vehicle;
determining, based at least in part on a first portion of the sensor data, a first pose of the vehicle;
determining, based at least in part on a second portion of the sensor data, a second pose of the vehicle;
determining a difference between the first pose and the second pose;
determining, based at least in part on the difference, a trajectory for the vehicle; and
controlling the vehicle to navigate in an environment according to the trajectory, wherein the trajectory is generated based on the second pose when determining that the difference meets or exceeds a threshold, or the trajectory is generated based on the first pose when determining that the difference does not meet the threshold.

16. The one or more non-transitory computer-readable media as recited in claim 15, the operations further comprising:
determining that the difference is equal to or less than a threshold distance or a pose threshold; and
determining, based at least in part on the difference being equal to or less than the threshold distance or the pose threshold, the trajectory using the first pose and exclusive of the second pose.

17. The one or more non-transitory computer-readable media as recited in claim 15, the operations further comprising:
determining that the difference meets or exceeds a threshold distance or a pose threshold; and
determining, based at least in part on the difference meeting or exceeding the threshold distance or the pose threshold, the trajectory using the second pose.

18. The one or more non-transitory computer-readable media as recited in claim 15, wherein the second pose is determined substantially simultaneously as the first pose.

19. The one or more non-transitory computer-readable media as recited in claim 15, wherein the trajectory is a first trajectory associated with a first time, and the operations further comprise:
causing, prior to receiving the sensor data, the vehicle to navigate in the environment according to a second trajectory associated with a second time, the second trajectory being different from the first trajectory and the second time being different from the first time.

20. The one or more non-transitory computer-readable media as recited in claim 15, wherein:
determining the first pose comprises determining the first pose according to a first frequency of operation; and
determining the first pose comprises determining the second pose according to a second frequency of operation different from the first frequency of operation.

* * * * *